United States Patent
Chung et al.

(10) Patent No.: US 12,457,132 B2
(45) Date of Patent: Oct. 28, 2025

(54) METHOD FOR TRANSMITTING DATA OF DEVICE IN WIRELESS COMMUNICATION SYSTEM, AND DEVICE USING SAME METHOD

(71) Applicants: LG ELECTRONICS INC., Seoul (KR); KOREA ADVANCED INSTITUTE OF SCIENCE AND TECHNOLOGY, Daejeon (KR)

(72) Inventors: Jaehoon Chung, Seoul (KR); Seungwon Keum, Seoul (KR); Sangmi Noh, Seoul (KR); Dangoh Kim, Seoul (KR); Juyong Lee, Seoul (KR); Dongho Cho, Seoul (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 54 days.

(21) Appl. No.: 18/691,010

(22) PCT Filed: Sep. 14, 2021

(86) PCT No.: PCT/KR2021/012477
§ 371 (c)(1),
(2) Date: Mar. 11, 2024

(87) PCT Pub. No.: WO2023/042925
PCT Pub. Date: Mar. 23, 2023

(65) Prior Publication Data
US 2024/0380639 A1    Nov. 14, 2024

(51) Int. Cl.
*H04L 25/02* (2006.01)
*H04B 17/309* (2015.01)

(52) U.S. Cl.
CPC ....... *H04L 25/0202* (2013.01); *H04B 17/346* (2023.05)

(58) Field of Classification Search
CPC .......................... H04L 25/0202; H04B 17/346
See application file for complete search history.

(56) References Cited

U.S. PATENT DOCUMENTS

| | | | |
|---|---|---|---|
| 11,863,330 B2 * | 1/2024 | Lee | H04L 5/0055 |
| 2010/0309793 A1 * | 12/2010 | Choi | H04L 1/0026 |
| | | | 370/252 |
| 2015/0015795 A1 * | 1/2015 | Park | H04N 21/44008 |
| | | | 348/731 |

FOREIGN PATENT DOCUMENTS

| | | |
|---|---|---|
| KR | 1020130130097 | 11/2013 |
| KR | 1020170033301 | 3/2017 |

(Continued)

OTHER PUBLICATIONS

PCT International Application No. PCT/KR2021/012477, International Search Report dated Jun. 2, 2022, 6 pages.

*Primary Examiner* — Jaison Joseph
(74) *Attorney, Agent, or Firm* — LEE, HONG, DEGERMAN, KANG & WAIMEY

(57) ABSTRACT

In a wireless communication system, a method for transmitting a transport block of a device and a device using the method are provided. The method is characterized by transmitting a transport block to another device, receiving measured channel information from the other device, and determining whether to retransmit the transport block, on the basis of a difference value between channel information estimated during transmission of the transport block and the measured channel information.

15 Claims, 21 Drawing Sheets

(56) References Cited

FOREIGN PATENT DOCUMENTS

| KR | 1020190127825 | 11/2019 |
|----|---------------|---------|
| WO | 2020204559 | 10/2020 |

\* cited by examiner

METHOD FOR TRANSMITTING DATA OF DEVICE IN WIRELESS COMMUNICATION SYSTEM, AND DEVICE USING SAME METHOD

CROSS-REFERENCE TO RELATED APPLICATION(S)

This application is the National Stage filing under 35 U.S.C. 371 of International Application No. PCT/KR2021/012477, filed on Sep. 14, 2021, the contents of which are all incorporated by reference herein in its entirety.

TECHNICAL FIELD

This disclosure relates to a data transmission method and a device using the method in a wireless communication system.

BACKGROUND

3rd Generation Partnership Project (3GPP) Long-Term Evolution (LTE) is a technology to enable high-speed packet communication. Many methods have been proposed to achieve the LTE goals of reducing costs for users and operators, improving service quality, expanding coverage, and increasing system capacity. 3GPP LTE requires lower cost per bit, improved service usability, flexible use of frequency bands, simple structure, open interface, and appropriate power consumption of the terminal as high-level requirements.

Work has begun at the International Telecommunication Union (ITU) and 3GPP to develop requirements and specifications for New Radio (NR) systems. 3GPP needs to identify and develop the technical components required to successfully standardize NR that satisfies both urgent market needs and the longer-term requirements set out by the ITU Radio Communication Sector (ITU-R) International Mobile Telecommunications (IMT)-2020 process in a timely manner. Additionally, NR should be able to use any spectrum band up to at least 100 GHz, which can be used for wireless communications even in the distant future.

NR targets a single technology framework that covers all deployment scenarios, usage scenarios, and requirements, including enhanced Mobile BroadBand (eMBB), massive Machine Type-Communications (mMTC), Ultra-Reliable and Low Latency Communications (URLLC), and more. NR should be inherently forward compatible.

With the commercialization of NR, which is the 5th generation (5G) mobile communication technology, research on the 6th generation (6G) mobile communication technology is beginning. The 6th generation mobile communication technology is expected to utilize a frequency band of 100 GHz or higher. Accordingly, it is expected that the available frequency can be increased by more than 10 times compared to 5G, and the possibility of utilizing space resources can be further increased. This frequency band above 100 GHz may be referred to as sub-terahertz (sub-THz).

In 6G after 5G, the peak data rate is aimed at 1 Tbps (Tera bits per second). In the case of the LDPC (low-density parity-check) decoder, there were no major problems in achieving the existing 5G goal of 20 Gbps (Giga bits per second).

However, in 6G, the bandwidth extends beyond 20 GHz and the sampling rate increases dramatically, resulting in very small slot durations. In addition, the target for URLLC is also very small, 100 us (micro second) (=0.1 millisecond). In this case, the speed of the LDPC decoder can cause problems.

In other words, the performance of LDPC decoders is insufficient to handle the large data volumes in 6G, and the number of HARQ operations in URLLC situations is expected to be very low. In order to increase the reliability of HARQ transmission in this situation, a faster retransmission technique is needed.

SUMMARY

The present disclosure provides a method for data transmission of a device in a wireless communication system and an apparatus using the method.

In one aspect, provided is a method of transmitting a transport block of a first device in a wireless communication system. The method includes transmitting the transport block to a second device, receiving measured channel information from the second device and determining whether to retransmit the transport block based on a difference between channel information estimated at a time of transmission of the transport block and the measured channel information.

In another aspect, provided is a first device operated in a wireless communication system. The first device includes at least one transceiver, at least one memory and at least one processor operably coupled to the at least one memory. The at least one processor is adapted to: transmit the transport block to a second device, receive measured channel information from the second device, and determine whether to retransmit the transport block based on a difference between channel information estimated at a time of transmission of the transport block and the measured channel information.

In still another aspect, provided is a processing device of a first device operating in a wireless communication system. The processing device includes at least one processor and at least one memory operably coupled to the at least one processor. The at least one processor is adapted to: transmit the transport block to a second device, receive measured channel information from the second device, and determine whether to retransmit the transport block based on a difference between channel information estimated at a time of transmission of the transport block and the measured channel information.

In still another aspect, provided is a computer readable medium (CRM) of a first device storing instructions for causing an operation to be performed by at least one processor. The operation includes transmitting the transport block to a second device, receiving measured channel information from the second device and determining whether to retransmit the transport block based on a difference between channel information estimated at a time of transmission of the transport block and the measured channel information.

In still another aspect, provided is a method of operating a second device in a wireless communication system. The method includes receiving a transport block from a first device and performing decoding at a first decoder, transmitting measured channel information generated by measuring the transport block to the first device, and performing decoding at a second decoder by receiving a retransmitted transport block based on a difference between channel information estimated at a time of transmission of the transport block by the first device and the measured channel information being greater than a threshold. Here, a time of reception of the retransmitted transport block precedes a time of completion of decoding of the transport block in the first decoder.

In still another aspect, provided is a second device operated in a wireless communication system. The second device includes at least one transceiver, at least one memory, and at least one processor operably coupled to the at least one memory. The at least one processor is adapted to: receive a transport block from a first device and perform decoding at a first decoder, transmit measured channel information generated by measuring the transport block to the first device, and perform decoding at a second decoder by receiving a retransmitted transport block based on a difference between channel information estimated at a time of transmission of the transport block by the first device and the measured channel information being greater than a threshold. Here, a time of reception of the retransmitted transport block precedes a time of completion of decoding of the transport block in the first decoder.

In the prior art, to overcome the performance limitations of LDPC decoders, the structure of the existing slots is modified, for example, by using mini slots, which can be said to satisfy the latency requirement of URLLC at the expense of throughput. In the present disclosure, the delay requirements of URLLC can be met while maintaining the existing slot structure, and both eMBB and URLLC users can be supported. Additionally, the flexibility of the frame structure can be greatly improved and the throughput reduction due to URLLC can be minimized. Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

DETAILED DESCRIPTION

Figure 1:
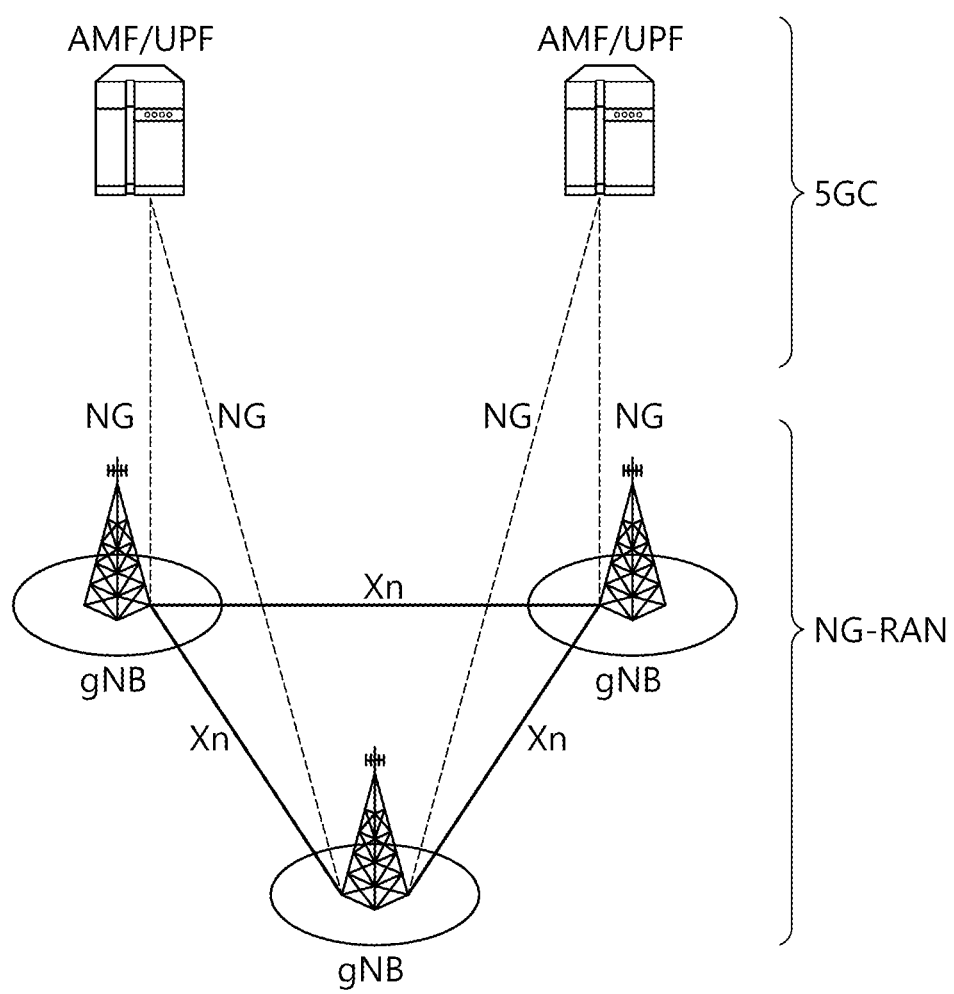
FIG. 1 illustrates the system structure of a New Generation Radio Access Network (NG-RAN) with NR.

The following techniques, devices and systems may be applied to a variety of wireless multiple access systems. Examples of multiple access systems include Code Division Multiple Access (CDMA) systems, Frequency Division Multiple Access (FDMA) systems, Time Division Multiple Access (TDMA) systems, Orthogonal Frequency Division Multiple Access (OFDMA) systems, and Single Access (SC-FDMA) systems. It includes a Carrier Frequency Division Multiple Access (MC-FDMA) system and a Multi-Carrier Frequency Division Multiple Access (MC-FDMA) system. CDMA can be implemented through wireless technologies such as Universal Terrestrial Radio Access (UTRA) or CDMA2000. TDMA can be implemented over wireless technologies such as Global System for Mobile communications (GSM), General Packet Radio Service (GPRS), or Enhanced Data rates for GSM Evolution (EDGE). OFDMA can be implemented through wireless technologies such as Institute of Electrical and Electronics Engineers (IEEE) 802.11 (Wi-Fi), IEEE 802.16 (WiMAX), IEEE 802.20, or Evolved UTRA (E-UTRA). UTRA is part of the Universal Mobile Telecommunications System (UMTS). 3rd Generation Partnership Project (3GPP) Long-Term Evolution (LTE) is part of Evolved UMTS (E-UMTS) using E-UTRA. 3GPP LTE uses OFDMA in the downlink (DL) and SC-FDMA in the uplink (UL). The evolution of 3GPP LTE includes LTE-A (Advanced), LTE-A Pro, and/or 5G NR (New Radio).

For convenience of explanation, implementations herein are primarily described in relation to a 3GPP based wireless communication system. However, the technical features of this specification are not limited to this. For example, the following detailed description is provided based on a mobile communication system corresponding to a 3GPP-based wireless communication system, but aspects of the present specification that are not limited to a 3GPP-based wireless communication system can be applied to other mobile communication systems.

For terms and technologies not specifically described among the terms and technologies used in this specification, reference may be made to wireless communication standard documents published prior to this specification.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one drawing in this specification may be implemented individually or simultaneously.

Although not limited thereto, various descriptions, functions, procedures, suggestions, methods and/or operational flow diagrams disclosed herein may be applied to various fields requiring wireless communication and/or connectivity (e.g., 5G) between devices.

Hereinafter, this specification will be described in more detail with reference to the drawings. In the following drawings and/or descriptions, like reference numbers may refer to identical or corresponding hardware blocks, software blocks and/or functional blocks, unless otherwise indicated.

For clarity of explanation, the description is based on a 3GPP communication system (e.g., LTE, NR, etc.), but the technical idea of the present disclosure is not limited thereto. LTE refers to technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to technology after TS 38.xxx Release 15. 3GPP 6G may refer to technologies after TS Release 17 and/or Release 18. "xxx" refers to the standard document detail number. LTE/NR/6G can be collectively referred to as a 3GPP system. Regarding background technology, terms, abbreviations, etc. used in the description of the present disclosure, reference may be made to matters described in standard documents published prior to the present disclosure.

Below, a transport block (TB) is described as an example of data, but this is not a limitation. That is, the data may be a code block, a code block group (CBG), etc. Content included in a transport block may also be referred to as a codeword.

NR supports multiple numerologies or subcarrier spacing (SCS) to support various 5G services. For example, if SCS is 15 kHz, it supports a wide area in traditional cellular bands, and if SCS is 30 KHz/60 kHz, it supports dense-urban, lower latency, and wider areas. It supports a wider carrier bandwidth, and when SCS is 60 kHz or higher, it supports a bandwidth greater than 24.25 GHz to overcome phase noise.

The NR frequency band can be defined as two types of frequency ranges (FR1, FR2). The values of the frequency range may vary. For example, the frequency ranges of the two types (FR1, FR2) may be as shown in Table 1 below. For convenience of explanation, among the frequency ranges used in the NR system, FR1 may mean "sub 6 GHz range" and FR2 may mean "above 6 GHz range" and may be referred to as MilliMeter Wave (mmW).

TABLE 1

| Frequency range designation | Frequency range | Subcarrier spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of 6 GHZ (or 5850, 5900, 5925 MHz, etc.). For example, the frequency band above 6 GHz (or 5850, 5900, 5925 MHz, etc.) included within FR1 may include an unlicensed band. Unlicensed bands can be used for a variety of purposes, for example for communications for vehicles (e.g. autonomous driving).

TABLE 2

| Frequency range designation | Frequency range | Subcarrier spacing |
|---|---|---|
| FR1 | 410 MHz-7125 MHz | 15, 30, 60 kHz |
| FR2 | 24250 MHz-52600 MHz | 60, 120, 240 kHz |

Here, wireless communication technologies implemented in the wireless device of this specification may include NarrowBand IoT (NB-IoT) for low-power communication as well as LTE, NR, and 6G. For example, NB-IoT technology may be an example of LPWAN (Low Power Wide Area Network) technology and may be implemented in standards such as LTE Cat NB1 and/or LTE Cat NB2, and is not limited to the above-mentioned names. Additionally or alternatively, the wireless communication technology implemented in the wireless device of the present specification may perform communication based on LTE-M technology. For example, LTE-M technology may be an example of LPWAN technology and may be called various names such as enhanced MTC (eMTC). For example, LTE-M technology may be implemented in at least one of a variety of specifications, including 1) LTE CAT 0, 2) LTE Cat M1, 3) LTE Cat M2, 4) LTE non-Bandwidth Limited (non-BL), 5) LTE-MTC, 6) LTE MTC, and/or 7) LTE M, and is not limited to the above designations. Additionally or alternatively, the wireless communication technologies implemented in the wireless devices of the present disclosure may include at least one of ZigBee, Bluetooth, and/or LPWAN with consideration for low power communication, and are not limited to the above designations. For example, Zigbee technology can create Personal Area Networks (PANs) for small/low-power digital communications based on various specifications such as IEEE 802.15.4, which can go by many names.

FIG. 1 illustrates the system structure of a next-generation radio access network (NG-RAN) to which NR is applied.

Referring to FIG. 1, NG-RAN may include a gNB and/or eNB that provide user plane and control plane protocol termination to the UE. FIG. 1 illustrates a case including only gNB. gNB and eNB are connected to each other through the Xn interface. The gNBs and eNBs are connected with the 5G Core Network (5GC) via NG interfaces. More specifically, the access and mobility management function (AMF) is connected via the NG-C interface, and the user plane function (UPF) is connected via the NG-U interface.

Figure 2:
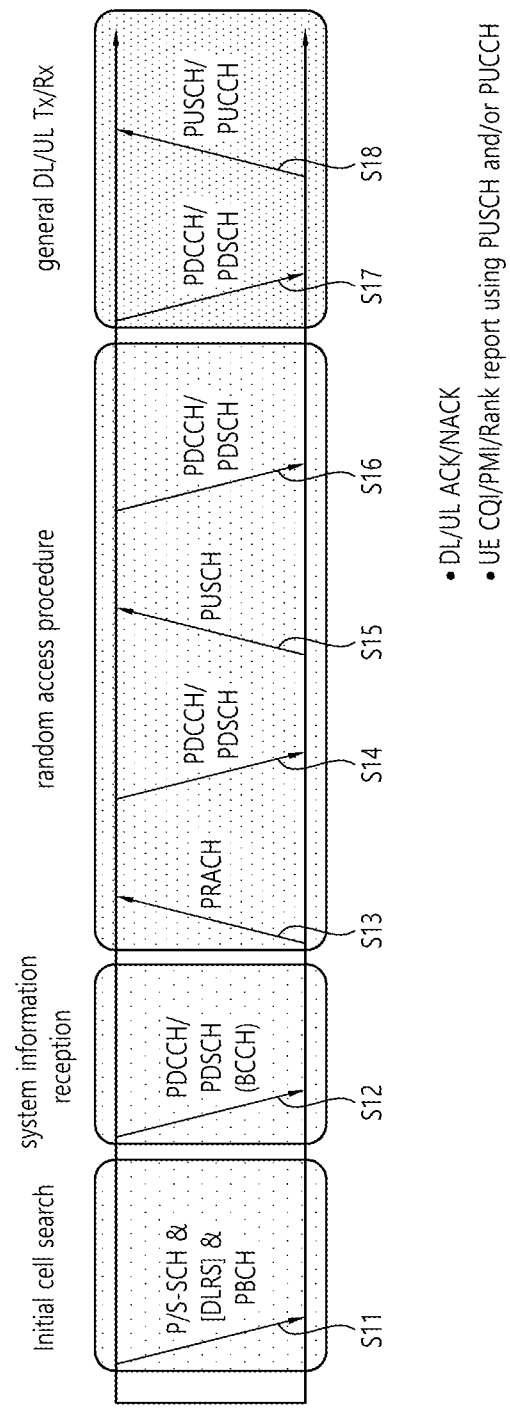
FIG. 2 illustrates the physical channels utilized in a 3GPP system and typical signal transmission.

FIG. 2 illustrates physical channels and typical signal transmission used in a 3GPP system. In a wireless communication system, a UE receives information from a base station through downlink (DL), and the UE transmits information to the base station through uplink (UL). The information transmitted and received between the base station and the UE includes data and various control information, and various physical channels exist depending on the type/purpose of the information they transmit and receive.

The UE which is powered on or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Meanwhile, if there are no radio resources to connect to the base station for the first time or to transmit a signal, the UE may perform a random access procedure (RACH, which may also be referred to as a random access process) to the base station (S13 to S16). To do this, the UE may transmit a specific sequence as a preamble over the Physical Random Access Channel (PRACH) (S13 and S15) and receive a response message (Random Access Response (RAR) message) to the preamble over the PDCCH and the corresponding PDSCH. In the case of contention-based RACH, an additional conflict resolution procedure can be performed (S16).

After performing the procedure described above, the UE can then perform PDCCH/PDSCH reception (S17) and Physical Uplink Shared Channel (PUSCH)/Physical Uplink Control Channel (PUCCH) transmission (S18) as a normal uplink signal transmission procedure. In particular, the UE may receive downlink control information (DCI) via PDCCH. The DCI includes control information, such as resource allocation information for the UE, and may be formatted differently depending on the intended use.

On the other hand, the control information transmitted by the UE to the base station via the uplink or received by the UE from the base station may include downlink/uplink ACK/NACK signals, channel quality indicators (CQI), precoding matrix indices (PMI), rank indicators (RI), etc. The UE may transmit control information such as CQI/PMI/RI described above via PUSCH and/or PUCCH.

<Structure of Uplink and Downlink Channels>
1. Downlink Channel Structure

The base station transmits related signals to the UE through a downlink channel described later, and the UE receives related signals from the base station through a downlink channel described later.

(1) Physical downlink shared channel (PDSCH)

PDSCH carries downlink data (e.g., DL-shared channel transport block, DL-SCH TB) and is subject to modulation methods such as Quadrature Phase Shift Keying (QPSK), 16 Quadrature Amplitude Modulation (QAM), 64 QAM, 256 QAM, etc. A codeword is generated by encoding TB. PDSCH can carry multiple codewords. Each codeword is scrambled and modulation mapped, and the modulation symbols generated from each codeword are mapped to one or more layers (Layer mapping). Each layer is mapped to resources along with DMRS (Demodulation Reference Signal), generated as an OFDM symbol signal, and transmitted through the corresponding antenna port.

(2) Physical downlink control channel (PDCCH)

PDCCH carries downlink control information (DCI) and QPSK modulation method is applied. One PDCCH consists of 1, 2, 4, 8, or 16 CCEs (Control Channel Elements) depending on the AL (Aggregation Level). One CCE consists of six REGs (Resource Element Group). One REG is defined by one OFDM symbol and one (P)RB.

The UE obtains DCI transmitted through the PDCCH by performing decoding (aka blind decoding) on a set of PDCCH candidates. The set of PDCCH candidates that the UE decodes is defined as the PDCCH search space set. The search space set may be a common search space or a UE-specific search space. The UE can obtain DCI by monitoring PDCCH candidates within one or more search space sets set by MIB or higher layer signaling.

2. Uplink Channel Structure

The UE transmits the relevant signals to the base station via the uplink channel described above, and the base station receives the relevant signals from the UE via the uplink channel described above.

(1) Physical Uplink Shared Channel (PUSCH)

PUSCH carries uplink data (e.g., UL-shared channel transport block, UL-SCH TB) and/or uplink control information (UCI) and is transmitted based on a CP-OFDM (Cyclic Prefix-Orthogonal Frequency Division Multiplexing) waveform, DFT-s-OFDM (Discrete Fourier Transform-spread-Orthogonal Frequency Division Multiplexing) waveform, etc. When the PUSCH is transmitted based on the DFT-s-OFDM waveform, the UE transmits the PUSCH by applying transform precoding. For example, when transform precoding is not possible (e.g., transform precoding is disabled), the UE may transmit PUSCH based on the CP-OFDM waveform, and when transform precoding is possible (e.g., transform precoding is enabled), the UE may transmit PUSCH based on the CP-OFDM waveform or the DFT-s-OFDM waveform. PUSCH transmissions can be dynamically scheduled by UL grants within the DCI, or semi-statically scheduled based on higher layer (e.g., RRC) signaling (and/or Layer 1 (L1) signaling (e.g., PDCCH)) (configured grant). PUSCH transmission can be performed based on codebook or non-codebook.

(2) Physical Uplink Control Channel (PUCCH)

A PUCCH carries uplink control information, HARQ-ACKs and/or scheduling requests (SRs) and may be divided into multiple PUCCHs based on the length of the PUCCH transmission.

<6G System General>

The 6G (wireless communication) system is aimed at (i) very high data rates per device, (ii) a very large number of connected devices, (iii) global connectivity, (iv) very low latency, (v) lower energy consumption for battery-free IoT devices, (vi) ultra-reliable connectivity, and (vii) connected intelligence with machine learning capabilities. The vision of the 6G system can be four aspects, such as intelligent connectivity, deep connectivity, holographic connectivity, and ubiquitous connectivity, and the 6G system can satisfy the requirements as shown in Table 3 below. In other words, Table 3 is an example of the requirements of the 6G system.

TABLE 3

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| Artificial intelligence (AI) | Fully |
| Autonomous vehicle | Fully |
| Extended Reality (XR) | Fully |
| Haptic Communication | Fully |

6G systems may have key factors such as enhanced mobile broadband (eMBB), ultra-reliable low latency communications (URLLC), massive machine-type communication: (mMTC), AI integrated communication, tactile internet, high throughput, high network capacity, high energy efficiency, low backhaul and access network congestion, and enhanced data security.

Figure 3:
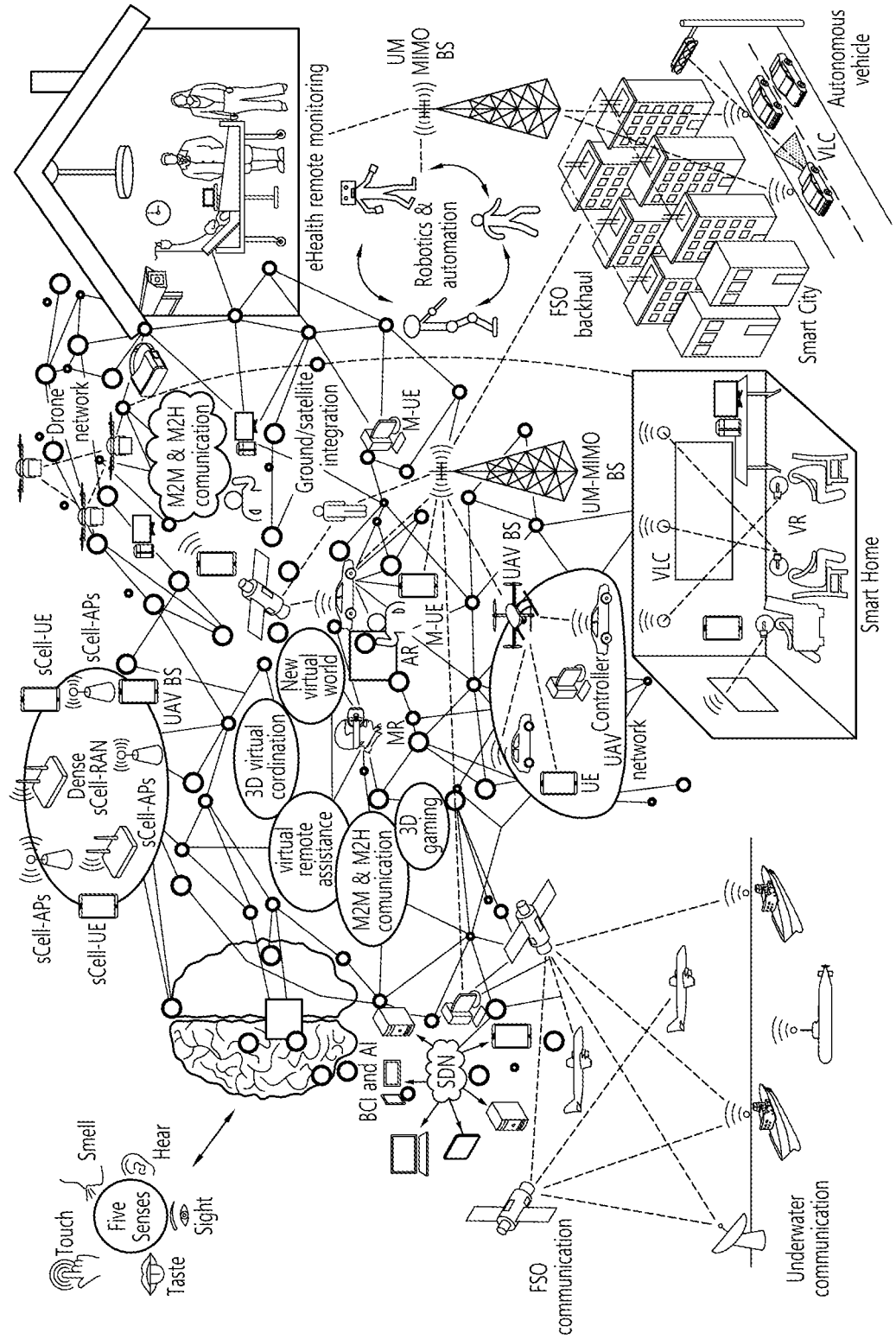
FIG. 3 illustrates an example of a communication structure that may be provided in a 6G system.

FIG. 3 is a diagram showing an example of a communication structure that can be provided in a 6G system.

The 6G system is expected to have simultaneous wireless communication connectivity that is 50 times higher than that of the 5G wireless communication system. URLLC, a key feature of 5G, will become an even more mainstream technology in 6G communications by providing end-to-end delays of less than 1 ms. The 6G system will have much better volumetric spectral efficiency, unlike the frequently used area spectral efficiency. 6G systems can offer very long battery life and advanced battery technologies for energy harvesting, so mobile devices will not need to be charged separately in a 6G system. New network characteristics in 6G may include:

Satellites integrated network: To provide a global mobile population, 6G is expected to be integrated with satellites. The integration of terrestrial, satellite, and airborne networks into a single wireless communication system is critical to 6G.

Connected intelligence: Unlike previous generations of wireless communication systems, 6G is revolutionary and will update the wireless evolution from "connected things" to "connected intelligence". AI can be applied at each step of the communication process (or each step of signal processing, as we will see later).

Seamless integration wireless information and energy transfer: 6G wireless networks will deliver power to charge the batteries of devices such as smartphones and sensors. Therefore, wireless information and energy transfer (WIET) will be integrated.

Ubiquitous super 3D connectivity: Access to networks and core network functions from drones and very low Earth orbit satellites will create super 3D connectivity at 6G ubiquity.

In the above new network characteristics of 6G, some general requirements may be as follows.

Small cell networks: The idea of small cell networks was introduced to improve the quality of received signals in cellular systems as a result of improved throughput, energy efficiency, and spectral efficiency. As a result, small cell networks are an essential characteristic for 5G and beyond 5G (5GB) communication systems. Therefore, 6G communication systems will also adopt the characteristics of small cell networks.

Ultra-dense heterogeneous networks: Ultra-dense heterogeneous networks will be another important characteristic of 6G communication systems. Multi-tier networks composed of heterogeneous networks will improve overall QoS and reduce costs.

High-capacity backhaul: Backhaul connectivity is characterized by high-capacity backhaul networks to support large volumes of traffic. High-speed fiber optics and free-space optics (FSO) systems are possible solutions to this problem.

Radar technology integrated with mobile technology: High-precision localization (or location-based services) over communications is one of the features of 6G wireless communication systems. Therefore, radar systems will be integrated with 6G networks.

Softwarization and virtualization: Softwarization and virtualization are two important features that are fundamental to the design process in a 5GB network to ensure flexibility, reconfigurability, and programmability. In addition, billions of devices may be shared on a shared physical infrastructure.

<THz (Terahertz) Communications>

Figure 4:
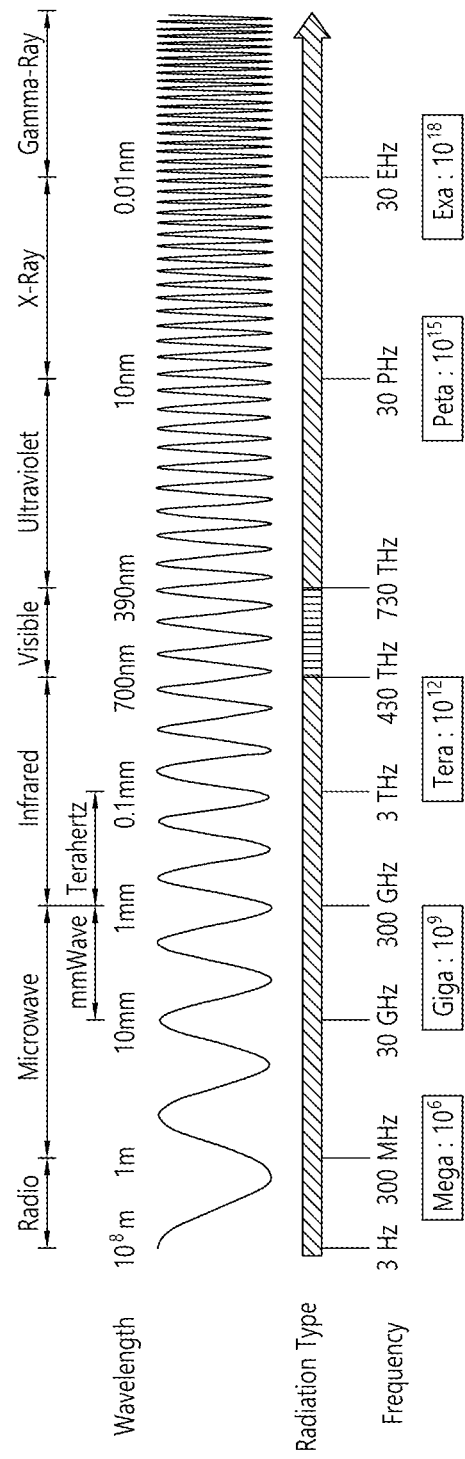
FIG. 4 illustrates an electromagnetic spectrum.

FIG. 4 illustrates the electromagnetic spectrum.

The data transfer rate can be increased by increasing the bandwidth. This can be accomplished by using sub-THz communications with wide bandwidth and applying advanced massive MIMO technology. THz waves, also known as submillimeter radiation, typically represent a frequency band between 0.1 THz and 10 THz with a corresponding wavelength in the range 0.03 mm~3 mm. The 100 GHz-300 GHz band range (Sub THz band) is considered the main part of the THz band for cellular communications. Adding the Sub-THz band to the mmWave band increases 6G cellular communication capacity. Among the defined THz bands, 300 GHz~3 THz is in the far infrared (IR) frequency band.

The key characteristics of THz communications include (i) widely available bandwidth to support very high data rates, and (ii) high path loss at high frequencies (highly directional antennas are indispensable). The narrow beamwidth produced by highly directive antennas reduces interference. The small wavelength of THz signals allows a much larger number of antenna elements to be integrated into devices and BSs operating in this band. This enables the use of advanced adaptive array techniques that can overcome range limitations.

The present disclosure will now be described.

In 6G mobile communications (6G), which follows on from existing 5G mobile communications (5G), the goal is to achieve a peak data rate of 1 Tbps (Tera bits per second). For low-density parity-check (LDPC) decoders, the original 5G target of 20 gigabits per second (Gbps) was not a problem.

However, in 6G, the bandwidth extends beyond 20 GHz and the sampling rate increases dramatically, resulting in very small slot durations. In addition, the target for ultra reliable low latency communication (URLLC) is also very small, at 100 us (micro second). Therefore, the speed of the LDPC decoder may cause problems.

In other words, the performance of LDPC decoders is insufficient to handle the large data volumes in 6G, and the number of HARQ operations in URLLC situations is expected to be very low. In order to increase the reliability of HARQ transmission in this situation, a faster retransmission technique is needed.

First, the conventional HARQ technique will be described.

Figure 5:
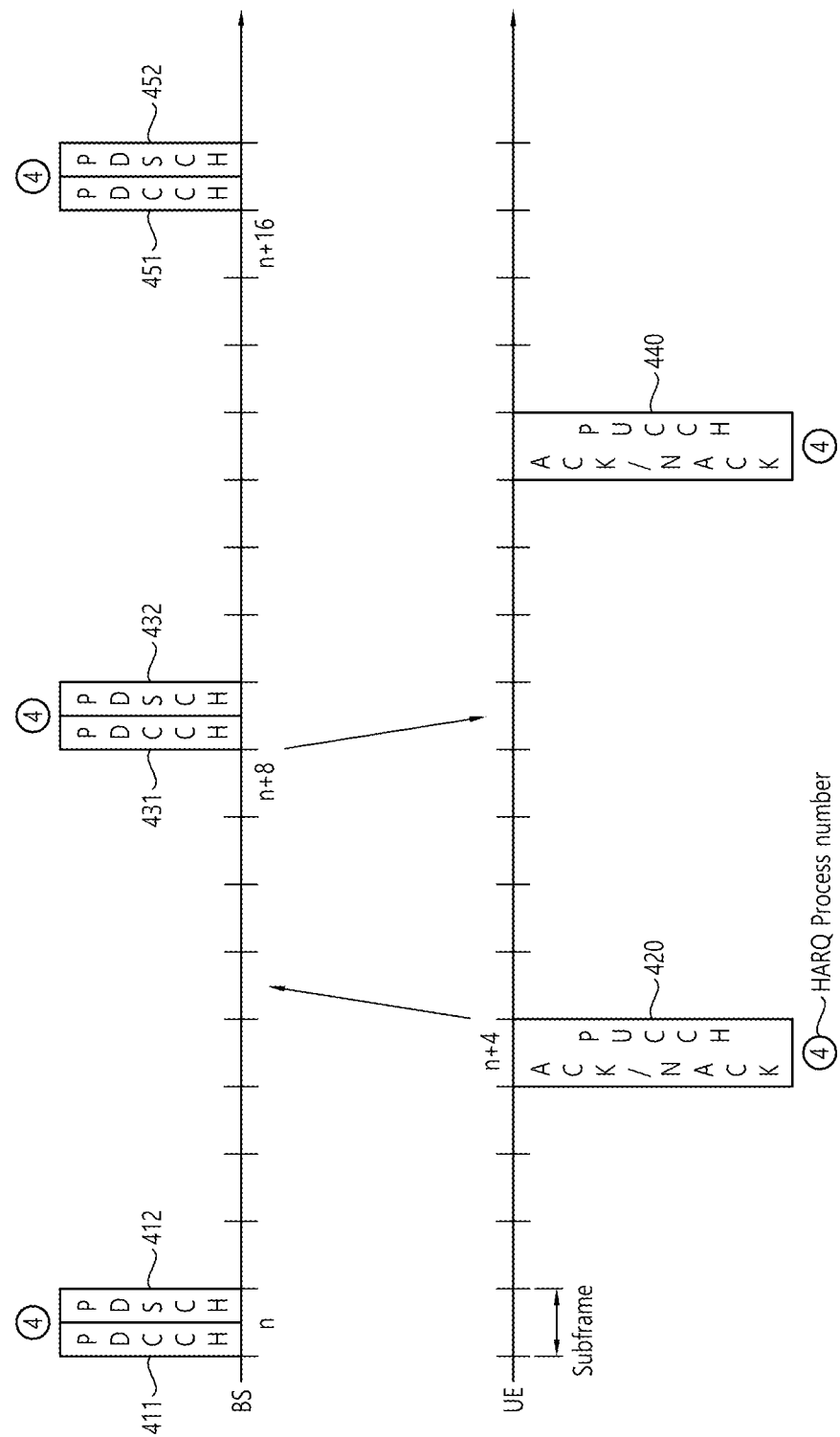
FIG. 5 illustrates a conventional HARQ operation.

FIG. 5 illustrates a conventional HARQ operation.

Referring to FIG. 5, the first device (e.g., a base station) transmits a downlink transport block to the second device (e.g., a UE) on the PDSCH 412 indicated by the downlink resource allocation on the PDCCH 411 in subframe n.

The UE sends an acknowledgment/negative acknowledgment (ACK/NACK) signal on the PUCCH 420 in subframe n+4. In one example, the resource of the PUCCH 420 used to transmit the ACK/NACK signal may be determined based on the resource of the PDCCH 411 (e.g., the index of the first CCE used to transmit the PDCCH 411).

When the base station receives a NACK signal from the UE, unlike the uplink HARQ, it does not necessarily retransmit in subframe n+8. Here, an example is shown of retransmitting a transport block on PDSCH 432 in subframe n+9, which is dictated by the downlink resource allocation on PDCCH 431.

The UE sends an ACK/NACK signal on the PUCCH (440) in the n+13th subframe. It is common to transmit ACK/NACK signals after decoding is completed in the UE's decoder.

The hybrid automatic repeat request (HARQ) method combines forward error correction (FEC) and automatic repeat request (ARQ) to increase performance by allowing the physical layer to check whether the data it receives contains unrecoverable errors and, if so, require retransmission.

In HARQ, the receiver notifies the transmitter of successful reception by sending an ACK (acknowledgment) signal as a reception acknowledgment if no errors are detected in the received data. If an error is detected in the received data, the receiver sends a negative acknowledgment (NACK) signal as a reception acknowledgment to notify the transmitter of the error detection. The transmitter can resend data when a NACK signal is received.

As illustrated in FIG. 5, in conventional HARQ, the round trip time between the transmission of the initial data (PDSCH) and the retransmission of the data (or the transmission of new data) is fixed at 8 ms or at least 8 ms.

In NR, instead of maintaining this 8 ms round trip, adaptive transmissions were made possible and methods were proposed to reduce the time to acknowledgment/negative acknowledgment (ACK/NACK) feedback by using mini slots.

However, since the conventional HARQ behavior is basically based on the ACK/NACK feedback signal sent by the receiver after decoding the data, it is necessary to reduce the delay of the decoder (LDPC decoder). In the past, early termination techniques that stop the decoder midway have been proposed.

time of the HARQ round trip. This method can increase the decoder speed to some extent, but is difficult to use in extreme environments of 6G.

The purpose of this disclosure is to propose a HARQ retransmission technique suitable for 6G mobile communication in a THz environment. The main features of the 6G THz environment are as follows. The first is a LoS (line of sight) environment close to AWGN (Additive white Gaussian noise), and the second is an increase in the complexity of LDPC hardware (HW) to support 1 Tbps.

The performance increase of LDPC decoders analyzed in the EPIC (Enabling Practical Wireless Tb/s Communications with Next Generation Channel Coding) project is unlikely to support the bandwidth increase from 5G to 6G and the reduction in URLLC (0.1 ms).

This disclosure will present a HARQ method that determines whether to retransmit data using channel feedback information without waiting for the LDPC decoding result based on THz channel characteristics close to predictable AWGN. The existing HARQ feedback structure is used as is, but additionally uses channel feedback to determine whether or not to retransmit data. While HARQ feedback information (i.e., ACK/NACK) is generated after decoding the data, channel feedback information can be generated directly by measuring the physical channel signal (e.g., a reference signal such as CSI-RS, DMRS, etc.) after receiving it within the Transmission Time Interval (TTI) (e.g., slot) containing the data, and thus can be generated faster than HARQ feedback information. Therefore, from the receiver's point of view, the time required to generate/send channel feedback information after receiving the data is shorter compared to the time required to generate/send HARQ feedback information after receiving the data. Additionally, as will be described later, in a 6G channel environment, it is possible to estimate with a high probability whether a data error has occurred based on channel feedback information. The present disclosure takes advantage of these points.

In order to describe the problems of existing HARQ, the frame structure predicted in 6G and LDPC decoder performance prediction are explained.

Carrier aggregation in the 5 GHz band is used, and the subcarrier spacing (SCS) is 15 Khz*$2^n$ to maintain compatibility with 5G.

Table 4 is the OFDM numerology for the 5 GHz band according to n.

TABLE 4

| | SCS | Minimum guard band (2.5%, based on 5G FR2 100 MHz or higher bands) | Transmission bandwidth | Num of subcarrier | FFT point | Channel bandwidth | Slot duration (1 ms/$2^n$) |
|---|---|---|---|---|---|---|---|
| n = 7 | 1.92 MHz | 125 MHz | 4746 MHz | 2472 | 4096 | 4996 MHz | 7.81 us |
| n = 8 | 3.84 MHz | 125 MHz | 4746 MHz | 1236 | 2048 | 4996 MHz | 3.9 us |
| n = 9 | 7.68 MHz | 125 MHz | 4700 MHz | 612 | 1024 | 4950 MHz | 1.95 us |
| n = 10 | 15.36 MHz | 125 MHz | 4608 MHz | 300 | 512 | 4858 MHz | 0.875 us |

Figure 6:
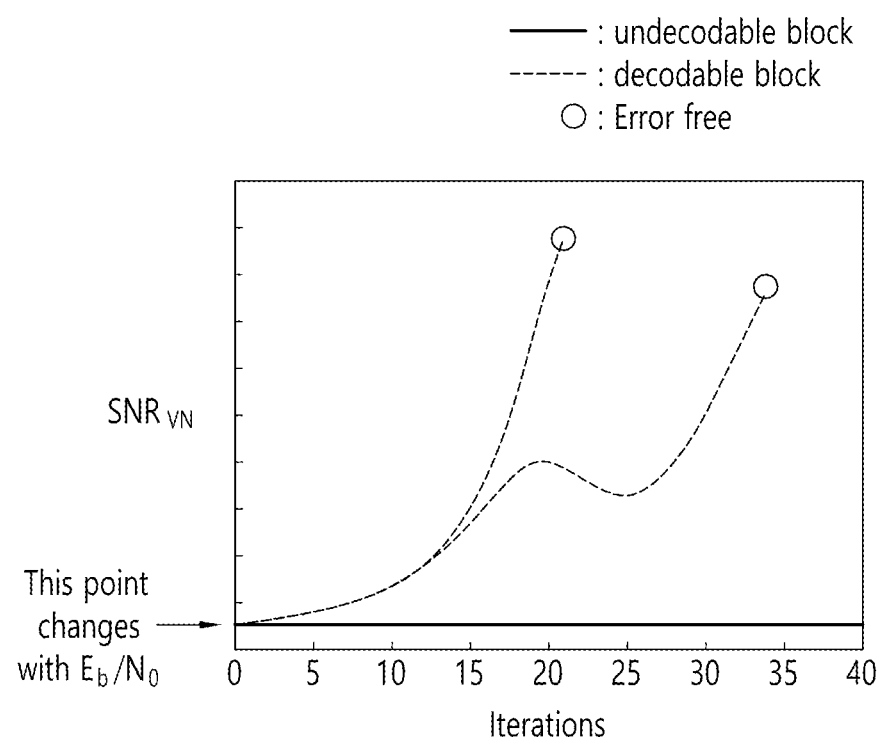
FIG. 6 illustrates an early termination graph of an LDPC decoder.

FIG. 6 shows the early termination graph of the LDPC decoder.

Figure 7:
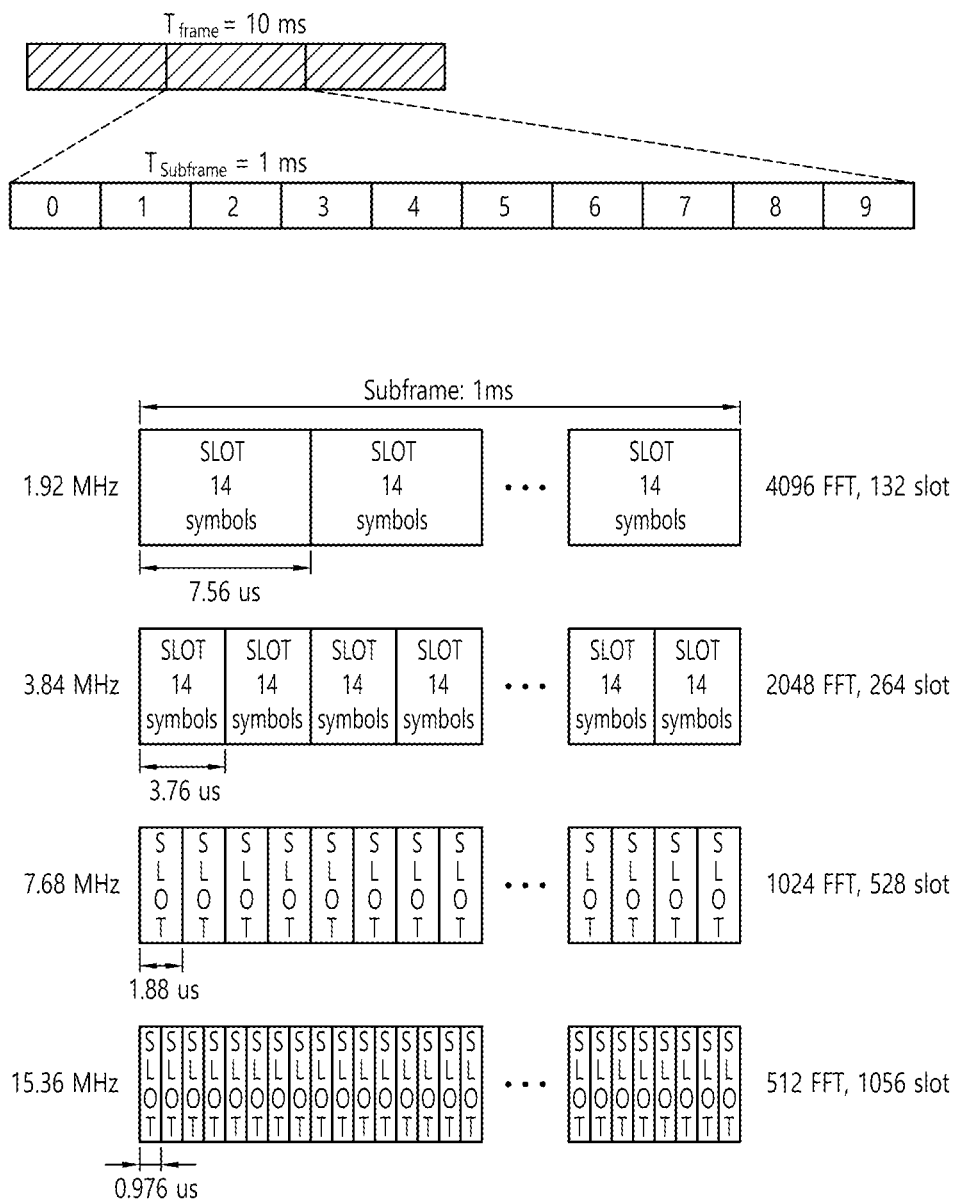
FIG. 7 illustrates a frame structure based on subcarrier spacing in the 5 GHz band.

Referring to FIG. 6, a traditional early termination technique is to establish a cost function per iteration to determine whether to continue the iteration or to determine a NACK and terminate the decoder, thereby reducing the processing FIG. 7 illustrates a frame structure according to subcarrier spacing in the 5 GHz band.

Referring to FIG. 7, for compatibility with 5G, 14 symbols per slot were maintained in the frame structure, and the frame was 10 ms and the subframe was 1 ms, all the same as 5G.

Here, it can be seen that at SCS=15.36 MHz to be used in 6G, the slot duration is greatly reduced to about 1 us (0.976 us).

The performance of LDPC decoders for 6G is currently difficult to predict, but can be inferred from the process and the EPIC project, which studied LDPC decoder performance to achieve 1 Tbps. The performance evaluation of process variations is known as shown in Table 5 below.

TABLE 5

| Parameter | Parameter in SoA technology node | Scaling factor | Scaled parameter |
| --- | --- | --- | --- |
| Throughput | T | $S_E$ | $T \cdot S_F$ |
| Clock Frequency | F | $S_F$ | $F \cdot S_F$ |
| Area | A | $S_A$ | $A \cdot S^n_A$ |
| Power | $P = EE \cdot T$ | $S_{EE} \cdot S_F$ | $P \cdot S_{EE} \cdot S_F$ |
| Area efficiency | $AE = T/A$ | $S_F/S_A$ | $AE \cdot S_F/S_A$ |
| Energy efficiency | EE | $S_{EE}$ | $EE \cdot S_{EE}$ |
| Power density | $PD = P/A$ | $S_{EE} \cdot S_F/S_A$ | $PD \cdot S_{EE} \cdot S_F/S_A$ |

As the process becomes smaller, the clock frequency increases, area decreases, and energy efficiency increases. Area reduction appears at a larger rate than energy efficiency increase. In addition, the HW complexity KPI (key performance indicator) of the LDPC decoder to achieve 1 Tbps is shown in Table 6.

TABLE 6

| FEC KPI bounds | |
| --- | --- |
| Area limit | 10 mm² |
| Area efficiency limit | 100 Gb/s/mm² |
| Energy efficiency limit | ~1 pJ/bit |
| Power density limit | 0.1 W/mm² |

Table 7 analyzes the performance of the LDPC decoders released so far in the EPIC project.

TABLE 7

| | SoA LDPC decoder | | | | | |
| --- | --- | --- | --- | --- | --- | --- |
| | [78] LDPC-BC partially | [80] LDPC-BC fully | [82] LDPC-BC unrolled | [83] LDPC-BC unrolled | [89] LDPC-CC pip. WD | [90] LDPC-CC pip. WD |
| Num. of decoders | 48 | 33 | 3 | 2 | 84 | 42 |
| Throughput (Gb/s) | 1005.0 | 1008.7 | 1170.0 | 1148.5 | 1005.5 | 1007.0 |
| Area (mm²) | 1.1 | 3.3 | 0.6 | 4.3 | 3.1 | 1.2 |
| Power (W) | 1.2 | 6.3 | 0.6 | 4.1 | 2.0 | 1.3 |
| Area Eff. (Gb/s/mm²) | 874.5 | 302.2 | 1880.4 | 265.9 | 325.0 | 820.5 |
| Pow. Den. (W/mm²) | 1.0 | 1.9 | 1.0 | 1.0 | 0.6 | 1.1 |
| Energy Eff. (pJ/bit) | 1.2 | 6.2 | 0.5 | 3.6 | 2.0 | 1.3 |
| Latency (us) | 0.03 | 0.06 | 0.03 | 0.10 | 0.34 | NA |
| Freq. (MHz) | 1000.0 | 1000.0 | 714.0 | 1000.0 | 1000.0 | 1000.0 |

Table 8 below shows the LDPC decoder performance when converted to 7 nm and 5 nm processes based on Table 7.

TABLE 8

| Spec | When using a 7 nm single decoder | When using 7 nm parallel 10 decoder | When using 5 nm process 13 decoder |
| --- | --- | --- | --- |
| Throughput | 1005.0 | 1005.0 | 1005.0 |
| Frequency | 1 GHz | 0.1 GHz | 0.0769 GHz |
| Area | 1.1 | 11 > 10(EPIC criteria) | 7.82 |
| Area Eff | 874.5 | 87.45 < 100(EPIC criteria) | 122.9 |
| Pow. Den | 1.0 | 0.1 | 0.097 |
| Latency | 0.03 us | 0.3 us | Estimated to be around 0.3 us |

In order to satisfy the EPIC project KPI, for example, 13 decoders in a 5 nm process may need to be processed in parallel and the frequency may be set to /1;13 GHz.

Figure 8:
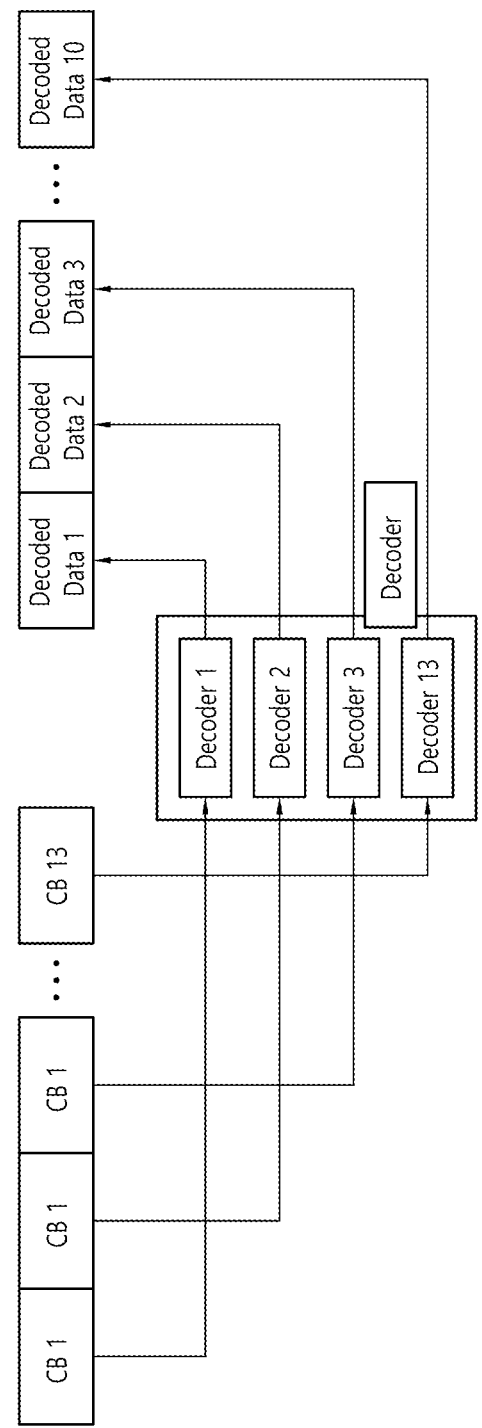
FIG. 8 illustrates parallel processing using 13 decoders on a 5 nm process.

FIG. 8 illustrates parallel processing using 13 decoders in a 5 nm process.

Code blocks 1 through 13 (CB 1 through 13) can be processed in parallel in each decoder one by one to produce the decoded data.

HARQ Round Trip Delay (RTT) Analysis

For HARQ RTT analysis, the bits of TB (transport block) transmitted in the slot can be calculated as follows.
1) SCS 15.36 MHz, slot interval 0.976 us, symbols per slot: based on 14 OFDM symbols
2) Data volume of 1 TTI (slot), one TB for layers 1 to 4/another TB for layers 5 to 8. That is, 2 TBs are transmitted in a total of 8 layers.
3) The amount of data for 1 slot, which is 1 TB, sent from 4 layers can be as follows.
4 (number of layers)*300 (number of subcarriers)*14 (number of OFDM symbols)*10(meaning 1024 QAM) =168,000 bits
4) 2 TB data amount sent across 8 layers=336,000 bits The processing time of the LDPC decoder based on Table 8 above may be as shown in Table 9.

TABLE 9

| | Lifting size | Code rate | CB size | Num of CB per TB | 2 TB decoder process time |
| --- | --- | --- | --- | --- | --- |
| 6G frame numerology | 32 | 8/9 | 792 | 212 | 9.78 |

Figure 9:
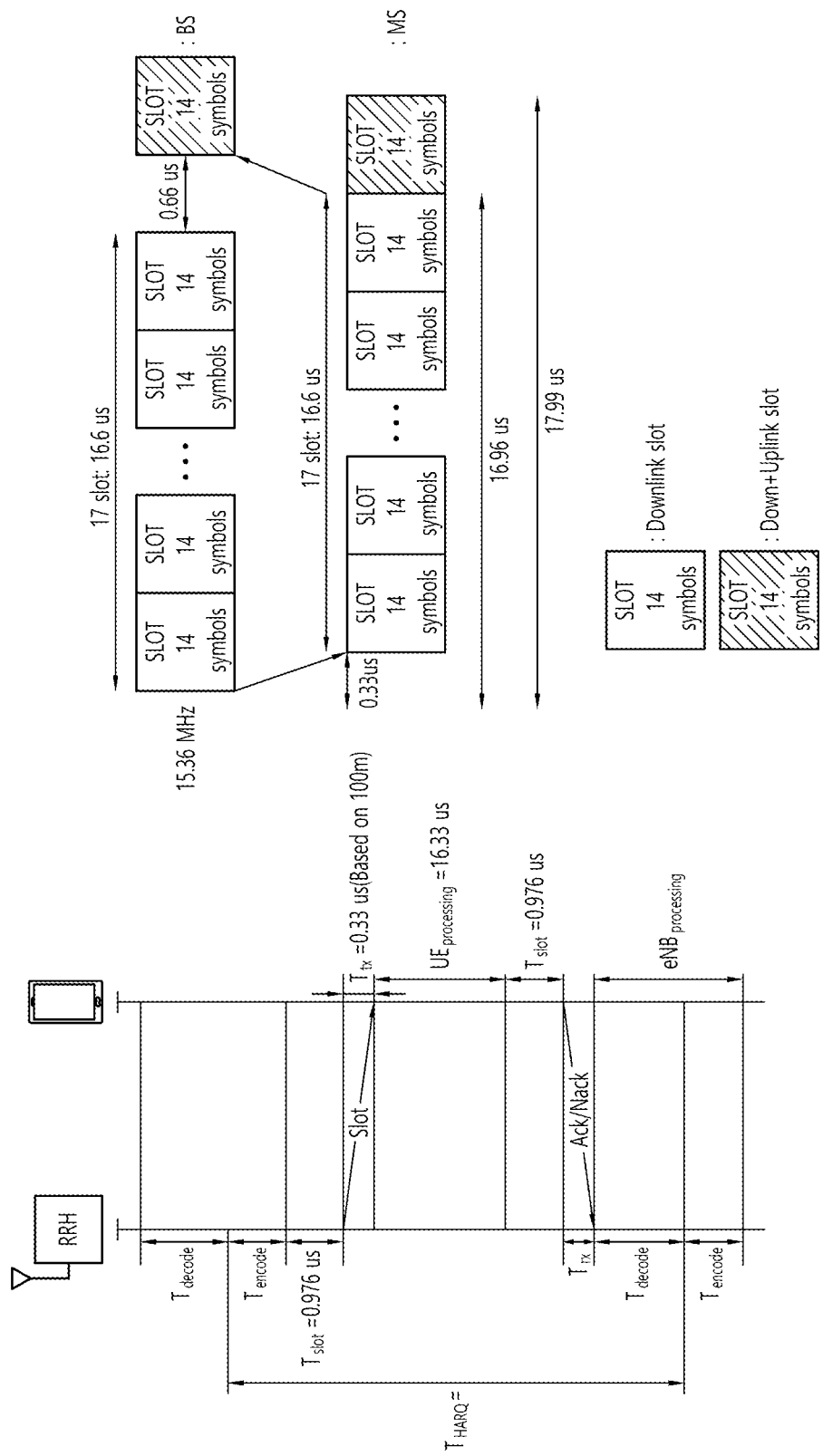
FIG. 9 shows the estimated HARQ RTT based on the LDPC decoder delays in Table 9.

FIG. 9 shows the HARQ RTT estimated based on the LDPC decoder delay in Table 9. Here, the processing time was based on the encoder value, and based on 5G, 67%*decoder time was applied.

Referring to FIG. 9, it is estimated that HARQ can be operated 2.83 times within the 6G URLLC standard of 0.1 ms, considering the processing time of the UE decoder, the transmission time between the two devices, the encoding time, and the decoding time. This is far below the existing HARQ maximum number of retransmissions and is unlikely to be reliable. Therefore, a new HARQ technique is needed.

Figure 10:
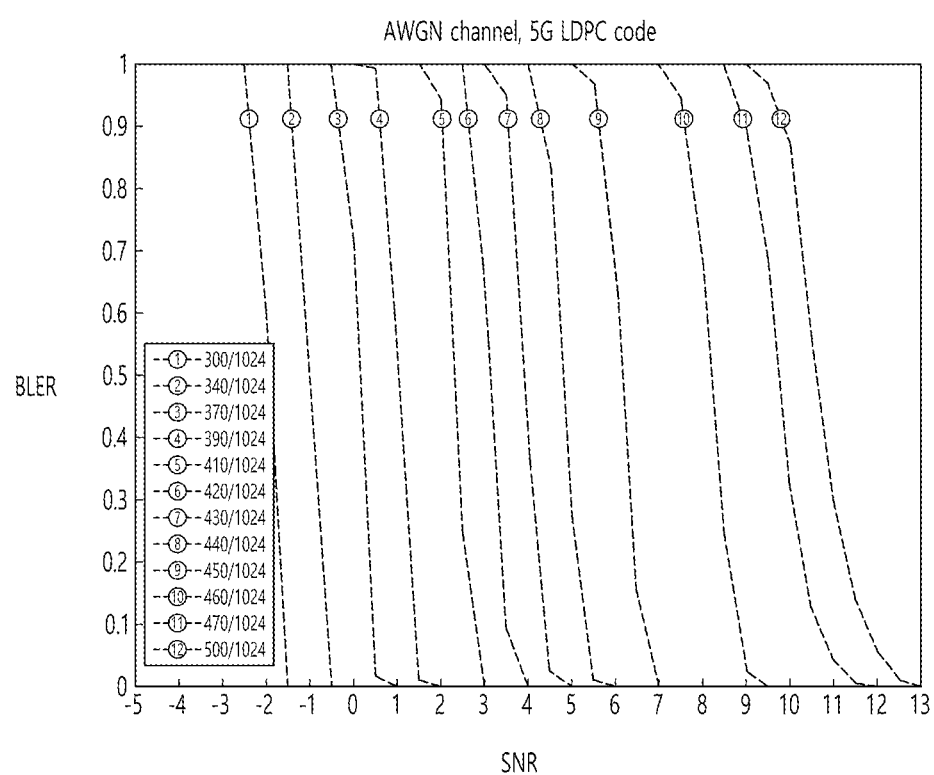
FIG. 10 shows the block error rate (BLER) as a function of SNR for a 5G LDPC code in an AWGN environment.

FIG. 10 shows block error rate (BLER) according to SNR of 5G LDPC code in AWGN environment.

As shown in FIG. 10, BLER is very sensitive to SNR differences. For example, when SNR changes between 0 and 1, BLER changes drastically between 1 and 0. It can be seen that, unlike 5G/4G in a multi-path environment, BLER responds very sensitively to SNR in a 6G environment. This suggests that, using i) the MCS level when the TB is created by the transmitter (the MCS level may be determined based on the SNR) and ii) the received SNR measured by the receiver using the received TB (or the MCS level for which the received SNR is known), the receiver can predict the decoding result with high probability without waiting for the decoding result of the LDPC decoder.

Figure 11:
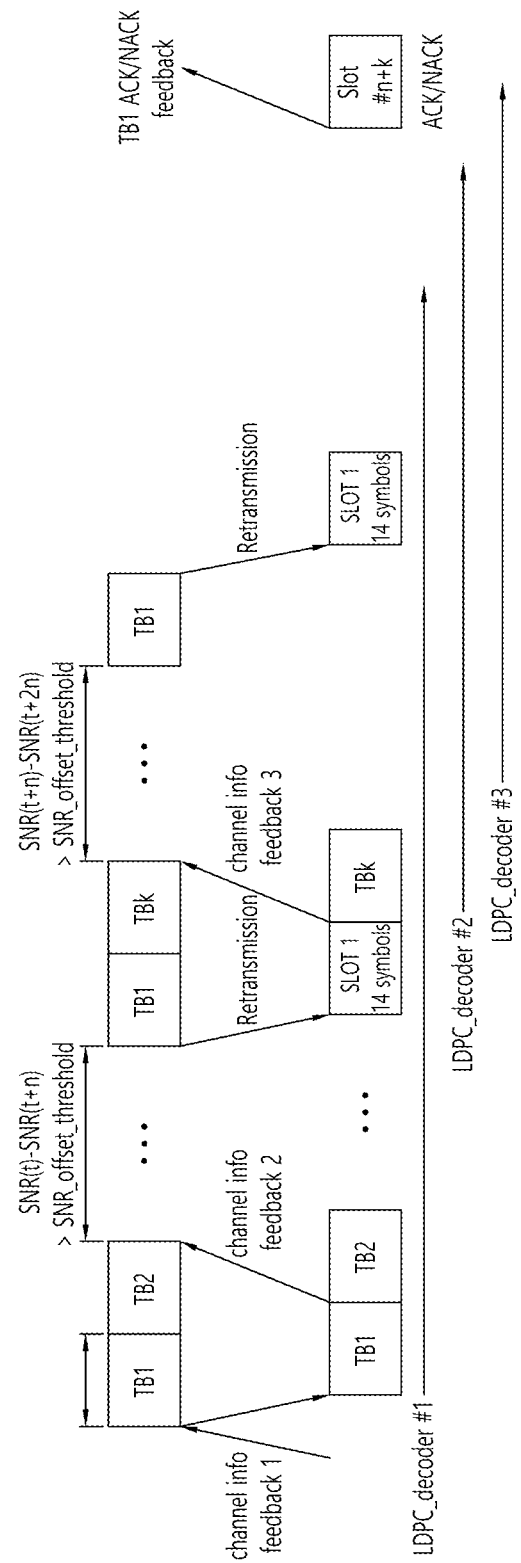
FIG. 11 is a conceptual diagram of a HARQ retransmission technique using channel feedback.

FIG. 11 is a conceptual illustration of the HARQ retransmission technique using channel feedback.

Referring to FIG. 11, the receiving end may operate based on the following method.

When a transport block (e.g., TB1) is received, short-term channel information for the transport block is collected/generated/estimated and fed back (indicated as channel info feedback 1, channel info feedback 2, channel info feedback 3). Short-term channel information can target accurate SNR (or SINR) estimation of the received transport block. The decoder at the receiving end can determine the decoding method by considering the channel information and the MCS (modulation and coding scheme) level of the transport block, and can determine the combine method with the newly transmitted transport block.

The transmitting end can operate in the following manner.

It determines whether to retransmit the transport block based on the channel information received from the receiving end. For example, the difference between the SNR(t) when transmitting TB1 and the SNR (t+n) received from the receiving end is compared with a threshold (indicated as SNR_offset_threshold), and if it is greater than the threshold, the transport block (TB1) is retransmitted. The retransmission technique can be optimized by considering latency and overhead, etc., depending on the received channel information.

Hereinafter, the present disclosure will be described in more detail.

Figure 12:
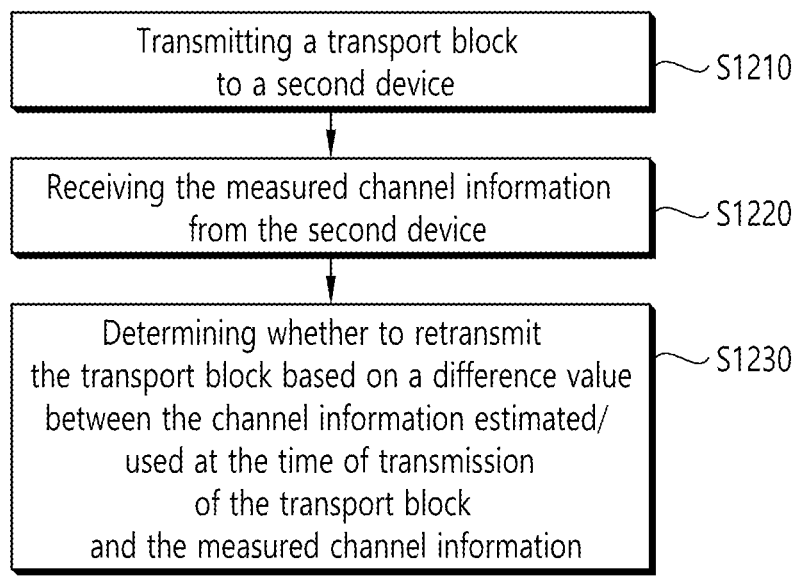
FIG. 12 illustrates a method of transmitting a transport block of a first device in a wireless communication system.

FIG. 12 illustrates a method of transmitting a transport block of a first device in a wireless communication system.

Referring to FIG. 12, a first device (e.g., a base station or a UE) transmits a transport block to a second device (e.g., a UE) (S1210).

The transport block may add a CRC to the information bits to be transmitted and perform code block segmentation according to the size of the information bits to which the CRC (cyclic redundancy check) is added. For example, if the size of the information bits to which the CRC is added is larger than a certain threshold, code block segmentation can be performed. A CRC is also added to the code block. Afterwards, channel coding, such as low density parity check (LDPC) coding or polar coding, may be performed. Afterwards, a rate matching process can be performed. Afterwards, code block concatenation can be additionally performed on the divided code blocks. Afterwards, it can be mapped to the resources of the data channel and transmitted.

The transport block may be transmitted with the first MCS applied. The first MCS may be determined based on an estimated channel state (SNR, SINR) at the time of transmission of the transport block. The estimated channel state may be estimated based on previous channel information measured and fed back by the second device prior to transmission of the transport block.

The first device receives the measured channel information from the second device (S1220).

The measured channel information may be generated by the second device by measuring a reference signal (e.g., CSI-RS, DMRS) in the transport block. The measured channel information may include at least one of information relating to a signal-to-interference-plus-noise ratio (SINR) or a signal-to-noise ratio (SNR) of the transport block received by the second device, and information about the MCS level.

The first device determines whether to retransmit the transport block based on a difference value between the channel information estimated at the time of transmission of the transport block and the measured channel information (S1230). For example, if the difference value is greater than a predetermined threshold, the transport block may be retransmitted, and if the difference value is less than or equal to the predetermined threshold, a new transport block may be transmitted without retransmitting the transport block.

Figure 13:
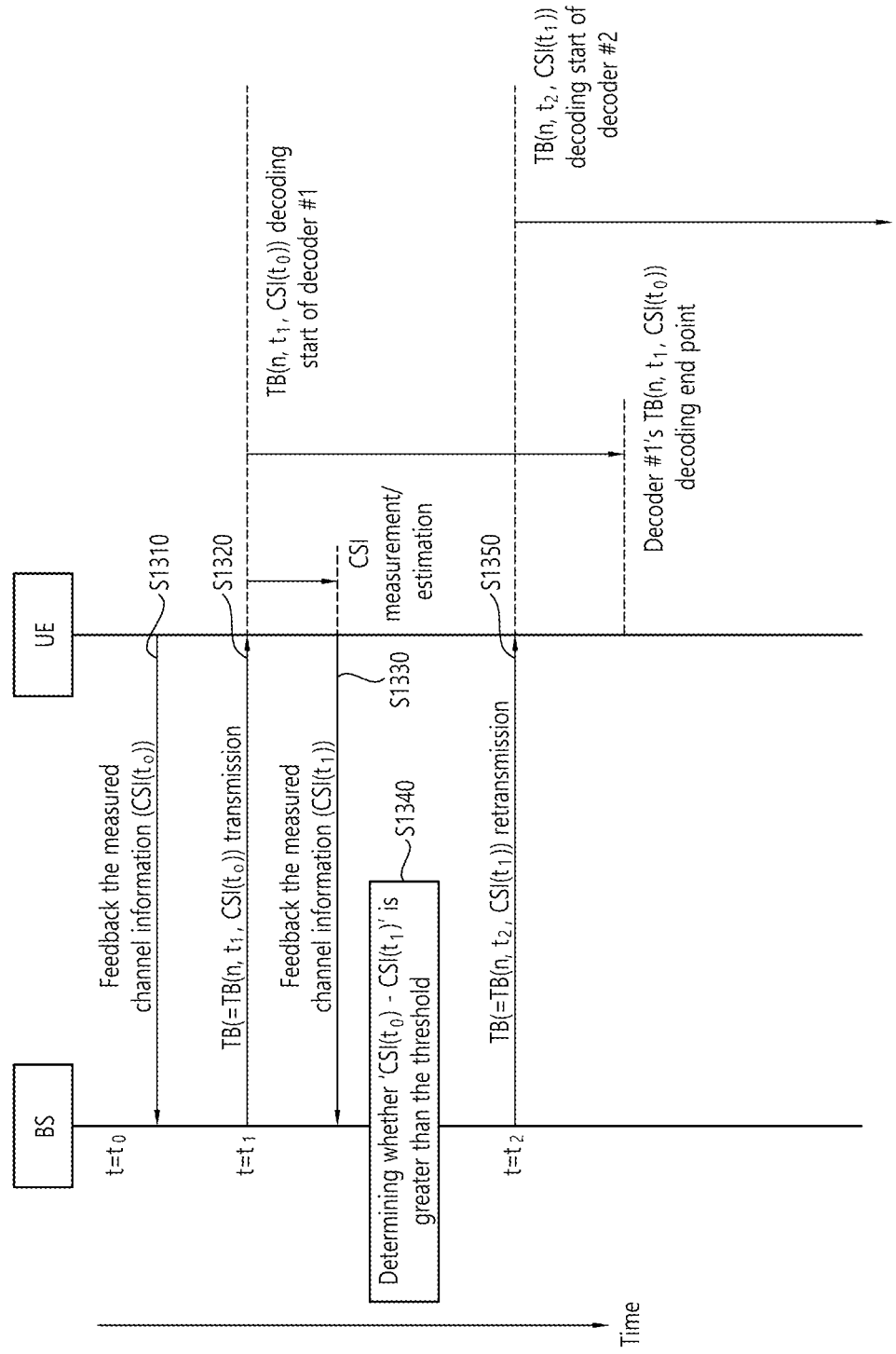
FIG. 13 illustrates an operation between a base station and a UE when applying the method of FIG. 12.

FIG. 13 illustrates the operation between the base station and the UE when applying the method of FIG. 12.

Referring to FIG. 13, the UE feeds back the measured channel information CSI ($t_0$) to the base station (S1310). CSI ($t_0$) may be channel state information estimated/generated by the UE by measuring a reference signal (e.g., CSI-RS, DMRS, etc., which may also be referred to as a pilot signal) that was in the slot containing the transport block (TB) transmitted by the base station to the UE at time $t_0$. Channel state information is information that can inform the state of the channel and may be diverse, such as SINR, SNR, MCS index, etc.

At time $t$-$t_1$, the base station may transmit a transport block (let's call this the nth TB for convenience) based on CSI($t_0$) to the UE (S1320). This transport block can be expressed as TB (n, $t_1$, CSI($t_0$)).

The UE receiving the transport block TB (n, $t_1$, CSI($t_0$)) generates CSI ($t_1$) by measuring a reference signal within the reception unit (e.g., slot or subframe) containing the transport block TB (n, $t_1$, CSI($t_0$)). Further, of the plurality of decoders included in the UE, for example, decoder #1 may begin decoding the transport block TB (n, $t_1$, CSI ($t_0$)). As mentioned above, the time required to generate CSI ($t_1$) is less than the time required to decode the transmit block TB(n, $t_1$, CSI($t_0$)) to generate the ACK/NACK.

The UE feedbacks the measured channel information CSI($t_1$) to the base station (S1330).

The base station determines whether the difference between CSI ($t_0$) and CSI($t_1$) is greater than the threshold (S1340). Here, there may be various methods to obtain the difference between CSI($t_0$) and CSI($t_1$). For example, the difference value between SNR($t_0$) determined based on CSI($t_0$) and SNR($t_1$) determined based on CSI($t_1$) may also correspond to the difference value between CSI($t_0$) and CSI($t_1$). Alternatively, the difference value between the MCS index determined based on CSI($t_0$) and the MCS index determined based on CSI($t_1$) may also correspond to the difference value between CSI($t_0$) and CSI($t_1$).

In other words, the base station decides whether to retransmit the above transport block based on the difference value between the channel information (CSI($t_0$)) estimated/used at the time of transmission of the above transport block and the channel information (CSI($t_1$)) measured/estimated and fed back by the UE.

In the above example, if the difference value between CSI($t_0$) and CSI($t_1$) is greater than the threshold, the base station may retransmit the nth TB to the UE at time $t=t_2$ (S1350). This transport block may be generated based on the CSI($t_1$). Such a transport block may be represented as TB (n, $t_2$, CSI ($t_1$)).

Decoder #1 in the UE has not yet finished decoding transmit block TB (n, $t_1$, CSI ($t_0$)) at time $t_2$, so decoder #2 can start decoding TB (n,$t_2$,CSI ($t_1$)).

Regarding the retransmission time of the transport block, in the prior art, after the decoding of TB (n, $t_1$, CSI($t_0$)) by decoder #1 is completed, the UE sends a NACK, which should be received by the base station before the base station retransmits the transport block.

In contrast, in the present disclosure, before decoder #1 finishes decoding TB (n, $t_1$, CSI($t_0$)), the UE feedbacks CSI($t_1$), and the base station retransmits the nth TB if certain conditions are satisfied based on the difference value between CSI($t_0$) and CSI($t_1$), so that the time required for retransmitting the nth TB is significantly reduced compared to the prior art.

Figure 14:
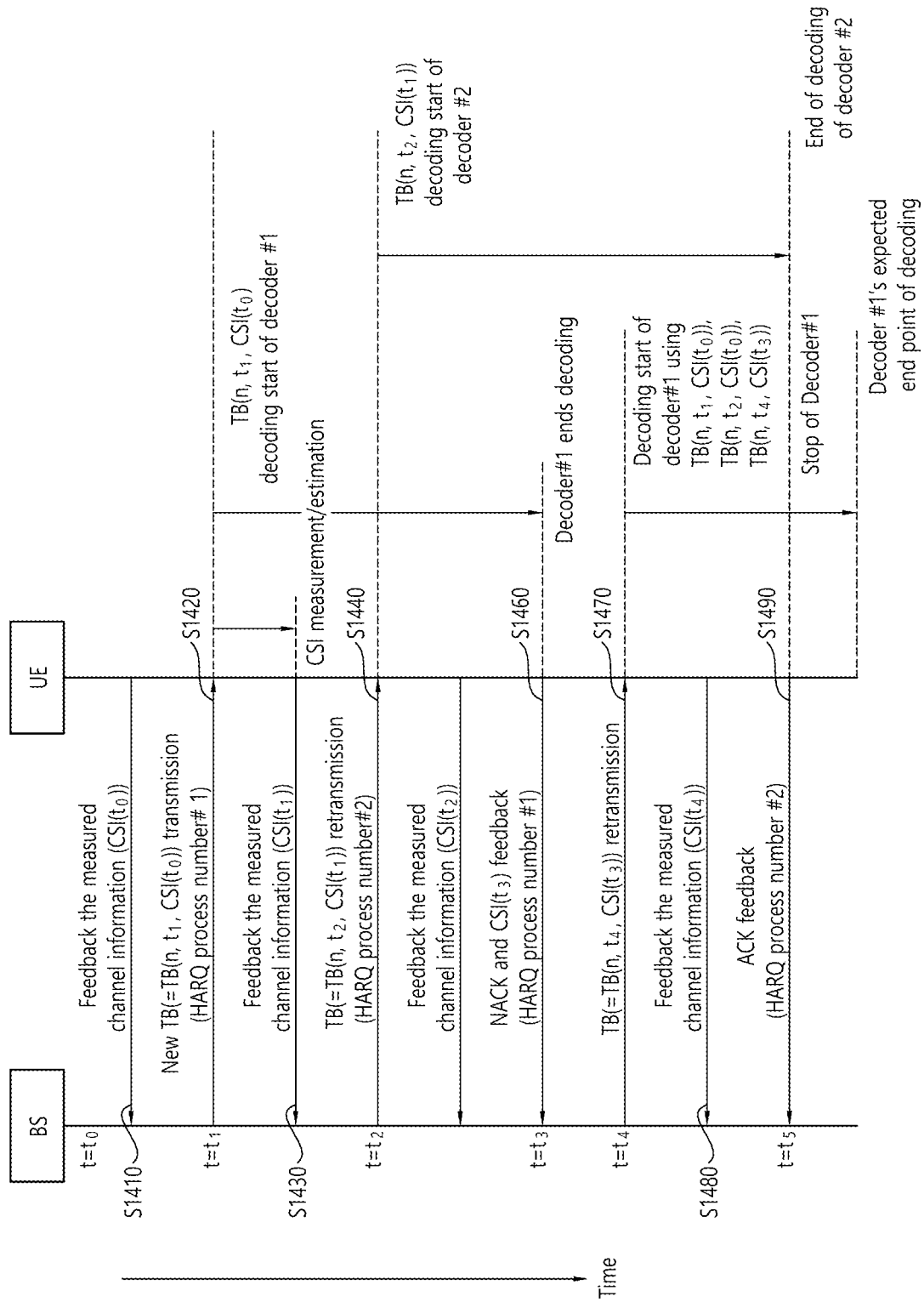
FIG. 14 illustrates HARQ retransmission more specifically.

FIG. 14 shows HARQ retransmissions more specifically.

Referring to FIG. 14, the base station receives feedback of the channel information CSI($t_0$) measured from the UE (S1410). As described above, CSI($t_0$) may be channel state information estimated/generated by the UE by measuring a reference signal that was within the slot containing the transport block transmitted by the base station to the UE at time $t_0$.

The base station may generate and transmit the nth TB, TB(n, $t_1$, CSI($t_0$)), at time $t_1$ based on CSI (to) (e.g., based on the MCS index included in CSI($t_0$)). HARQ process number #1 can be assigned to TB (n, $t_1$, CSI($t_0$)) transmission.

The UE estimates short term CSI using a pilot signal (reference signal) at time $t_1$. As described above, CSI($t_1$) can be estimated using pilots that can estimate channels such as CSI-RS and DMRS in a slot transmitted like the TB (n, $t_1$, CSI($t_0$)). Depending on the pilot structure of the slot including the TB, the pilot used and the algorithm for estimating the short-term channel may be changed. The CSI($t_1$) (S1430) that is fed back includes information based on short-term channel estimation.

By comparing the CSI($t_0$) information used to generate TB(n, $t_1$, CSI($t_0$)) with the CSI($t_1$) measured by the UE based on TB(n, $t_1$, CSI($t_0$)), the base station can determine that the TB is in error if it crosses a certain threshold. Then, at time t=$t_2$, TB(n, $t_2$, CSI($t_1$)) is retransmitted based on CSI($t_1$) (S1440). HARQ process number #2 can be assigned to TB (n, $t_2$, CSI($t_1$)) transmission.

As a metric to determine whether to retransmit, the difference between the SNR at TB creation and the SNR estimated by the UE is used as a metric, and retransmission is triggered when a certain threshold is crossed (i.e., (SNR ($t_0$)−SNR($t_1$))>threshold). Based on the various parameters of CSI, the optimal metric can be changed and used according to the situation.

Since the UE has received a new TB at time $t_2$ while decoder #1 has not finished decoding, it can start decoding TB(n, $t_2$, CSI($t_1$)) using the new decoder #2. At this time, the already received TB(n, $t_1$, CSI($t_0$)) and TB(n, $t_2$, CSI($t_1$)) may be combined in an appropriate manner and decoded. Different decoding schemes can be used, for example, using only TB(n, $t_1$, CSI($t_0$)) without using TB(n, $t_2$, CSI($t_1$)), or using both TBs, TB(n, $t_1$, CSI($t_0$)) and TB(n, $t_2$, CSI($t_1$)), using a soft combine.

The UE may estimate/generate CSI($t_2$) using a pilot that can estimate channels such as CSI-RS and DMRS in the slot being transmitted with TB(n, $t_2$, CSI($t_1$)), and feedback CSI($t_2$) to the base station (S1450).

Assume that at time $t_3$, decoder #1 fails decoding and transmits NACK (S1460). At this time, the UE may also transmit CSI($t_3$). CSI($t_3$) may be channel state information for time $t_3$.

Then, the base station can transmit TB(n, $t_4$, CSI($t_3$)) at time $t_4$ (S1470). The UE feeds back the measured channel information CSI($t_4$) (S1480).

Since the base station has received a NACK (S1460), it retransmits a new TB(n, $t_4$, CSI($t_3$)) at time $t_4$, at which point the UE can decode all the nth TBs it has received previously, TB(n, $t_1$, CSI($t_0$)), TB(n, $t_2$, CSI ($t_1$)), and TB(n, $t_4$, CSI($t_3$)), in various combinations/methods, through its unused decoder (e.g., decoder #1). As mentioned earlier, the decoding method can be changed depending on the system situation.

Then, if decoder #2 successfully decodes TB(n, $t_2$, CSI ($t_1$)) and the UE feedbacks an ACK (S1490), decoder #2 exits, and decoder #1 stops decoding and stops.

For example, at time $t_5$, if decoder #2 successfully decodes the nth TB (TB(n, $t_2$, CSI($t_1$) at this point), the UE may send an ACK (S1490) and release all decoders in use to decode the nth TB.

<Proposed HARQ Retransmission Performance Evaluation>

Figure 15:
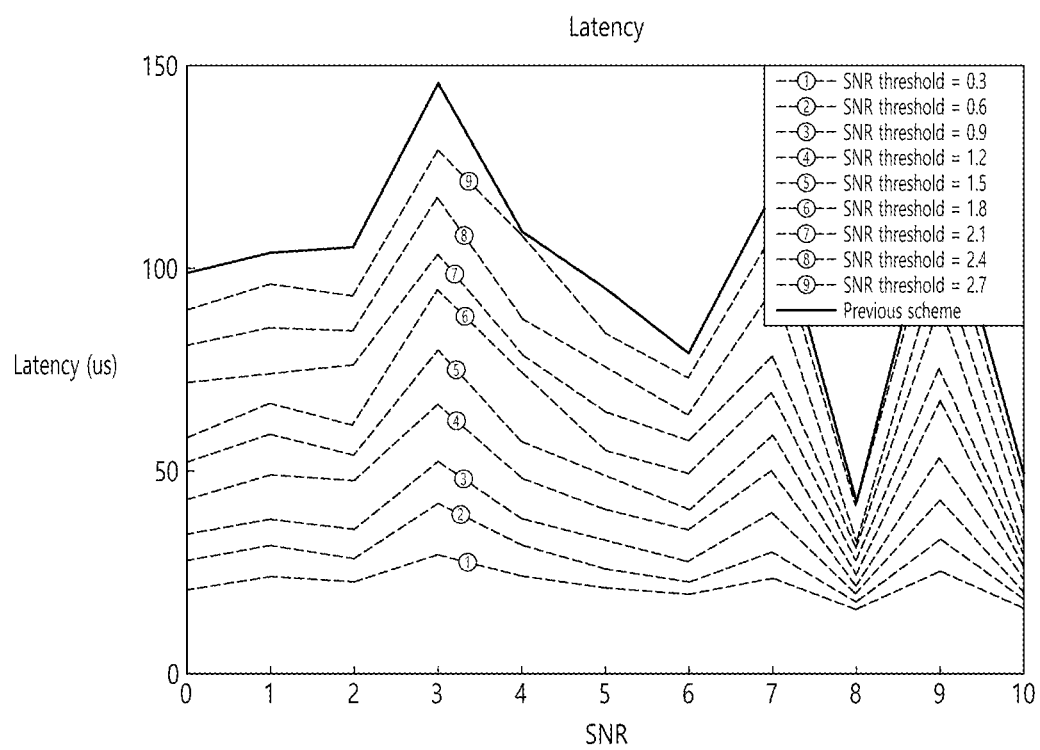
FIG. 15 illustrates a HARQ delay performance evaluation of the proposed method.
Figure 16:
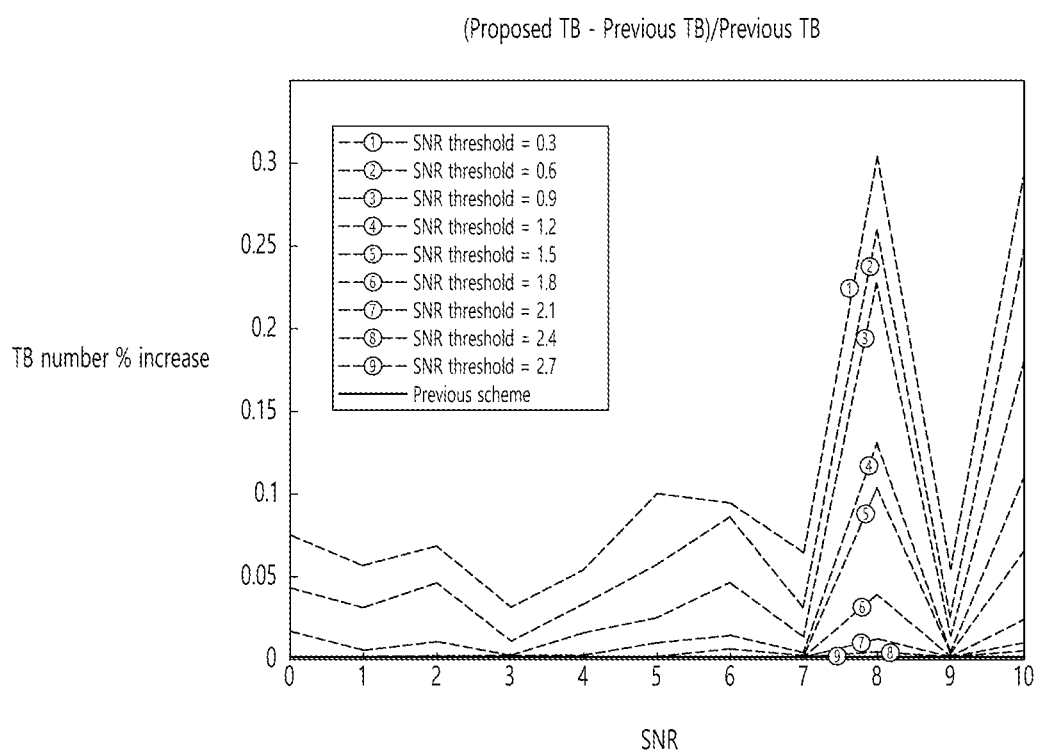
FIG. 16 illustrates the HARQ delay overhead of the proposed method.

FIG. 15 shows the HARQ delay performance evaluation of the proposed method, and FIG. 16 shows the HARQ delay overhead of the proposed method.

The present disclosure may evaluate the performance of a channel feedback based HARQ retransmission technique by comparing the difference between the estimated SNR at transmission and the measured SNR at reception to an SNR threshold, and retransmitting if the difference is greater than the SNR threshold.

In FIG. 15 and FIG. 16, 'Previous scheme' represents a technique of retransmitting based on ACK/NACK after decoding is completed.

In FIG. 15, it can be seen that when the SNR threshold=0.3 is set, the delay is reduced by about 75% compared to the previous version.

Looking at FIG. 16, it can be seen that the lower the SNR threshold is set, the higher the transmission overhead is (approximately 10% increase). In other words, there is a tradeoff between delay and overhead. By estimating the SNR threshold in the situation of the system, the optimal channel feedback-based retransmission criteria can be determined.

Advantageous Effects of the Present Disclosure

In the prior art, to overcome the performance limitations of LDPC decoders, the structure of the existing slots is modified, for example, by using mini slots, which can be said to satisfy the latency requirement of URLLC at the expense of throughput. In this disclosure, the delay requirements of URLLC can be satisfied while maintaining the existing slot structure, and both eMBB users and URLLC users can be supported. Additionally, the flexibility of the frame structure can be greatly improved and the throughput reduction due to URLLC can be minimized. The effects that may be derived from the specific examples of the present disclosure are not limited to those listed above. For example, there may be a variety of technical effects that a person having ordinary skill in the related art may understand or induce from the disclosure. Accordingly, the specific effects of the present disclosure are not limited to those expressly described herein, but may include a variety of effects that may be understood or induced from the technical features of the present disclosure.

Although not limited thereto, the various proposals of the present disclosure described above can be applied to a variety of fields requiring wireless communication/connectivity (e.g., 5G) between devices.

Figure 17:
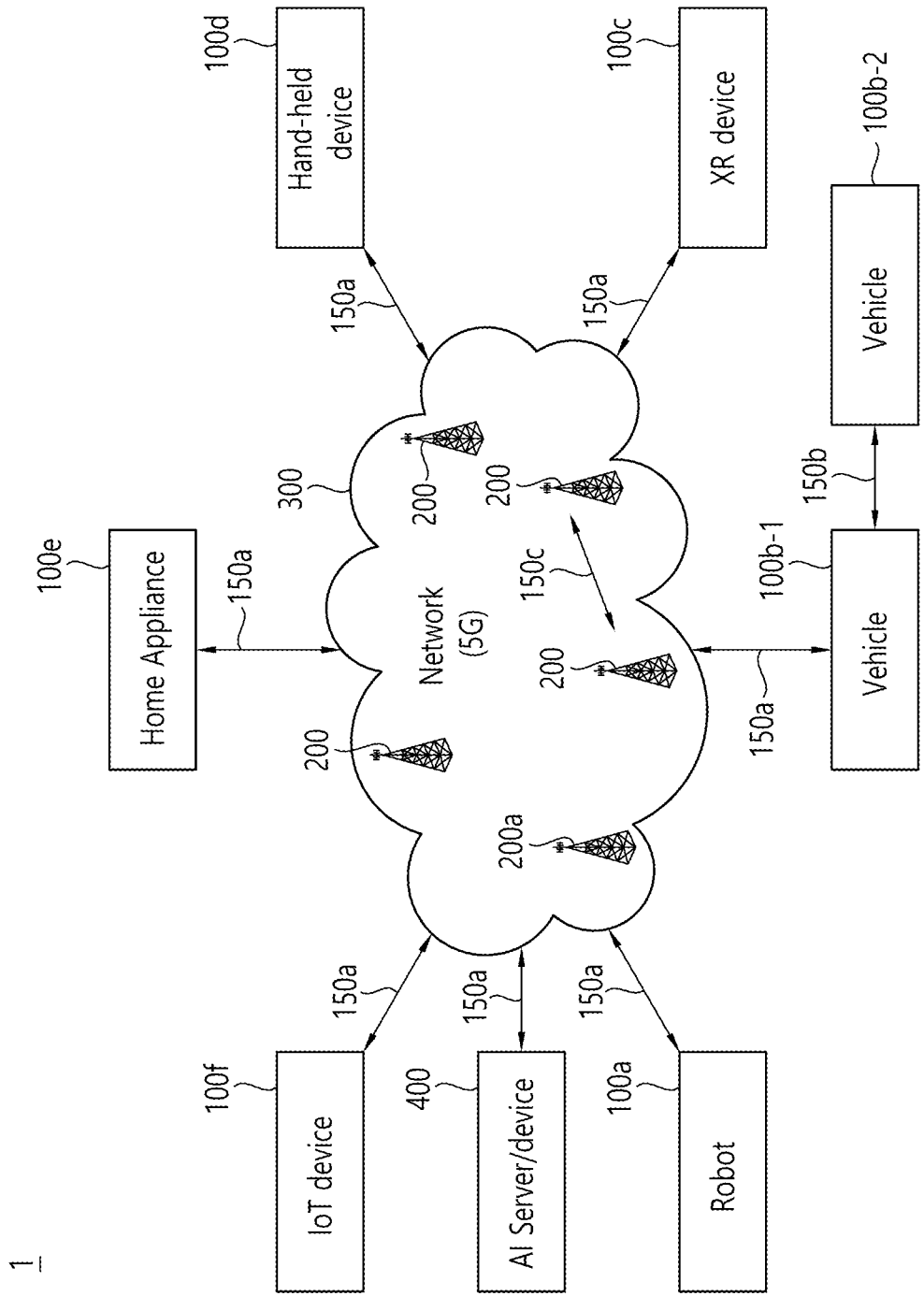
FIG. 17 illustrates a communication system 1 applicable to the present disclosure.

FIG. 17 illustrates a communication system 1 applied to the present disclosure.

Referring to FIG. 17, the communication system 1 applied to the present disclosure includes a wireless device, a base station, and a network. Here, the wireless device refers to a device that performs communication using a wireless access technology (e.g., 5G NR (New RAT), LTE (Long Term Evolution)), and may be referred to as a communication/wireless/5G device. Although not limited thereto, the wireless device may include a robot 100a, a vehicle 100b-1, 100b-2, an extended Reality (XR) device 100c, a hand-held device 100d, and a home appliance 100e.), an Internet of Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include AR (Augmented Reality)/VR (Virtual Reality)/MR (Mixed Reality) devices, and it may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The portable device may include a smart phone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and a specific wireless device 200a may operate as a base station/network node to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b may be established between the wireless devices 100a~100f/BS 200-BS 200/wireless device 100a~100f. Herein, the wireless communication/connections may be established through various RATs (e.g., 5G NR) such as uplink/downlink communication 150a, sidelink communication 150b (or, D2D communication). The wireless devices and the BSs/the wireless devices may transmit/receive radio signals to/from each other through the wireless communication/connections 150a and 150b. For example, the wireless communication/connections 150a and 150b may transmit/receive signals through various physical channels based on all/part of the process of FIG. 2. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
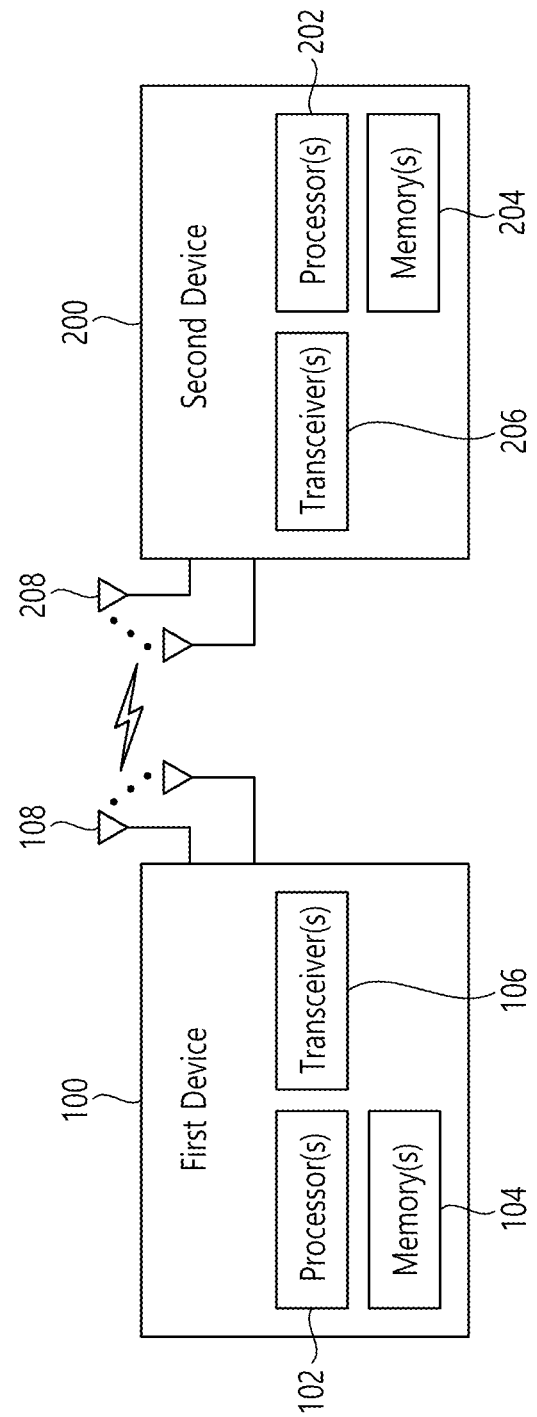
FIG. 18 illustrates a wireless device that may be applied to the present disclosure.

FIG. 18 illustrates a wireless device applicable to the present disclosure.

Referring to FIG. 18, the first wireless device 100 and the second wireless device 200 may transmit and receive wireless signals through various wireless access technologies (e.g., LTE, NR). Here, {first wireless device 100, second wireless device 200} may correspond to {wireless device 100x, base station 200} and/or {wireless device 100x, wireless device 100x} of FIG. 17.

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the described/suggested functions, procedures and/or methods in above. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processory 102 and may store a variety of information related to operations of the processor 102. For example, the memory 104 may store software code including commands for performing a part or the entirety of processes controlled by the processor 102 or for performing the described/suggested procedures and/or methods. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present disclosure, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the described/suggested functions, procedures and/or methods in above. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the described/suggested procedures and/or methods in above. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The functions, procedures, proposals, and/or methods disclosed in this document may be implemented using firmware or software and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

The first device may be, for example, a base station, a relay station, or a UE. The first device may include one or more transceivers, one or more memories, and one or more processors operably coupled to the one or more memories. The one or more processors may transmit the transport block to the second device, receive measured channel information from the second device, and determine whether to retransmit the transport block based on a difference between the channel information estimated at the time of transmission of the transport block and the measured channel information.

The second device may be, for example, a relay station, a UE. The second device may include one or more transceivers, one or more memories, and one or more processors operably coupled to the one or more memories. The second device receives a transport block from a first device and performs decoding at a first decoder, transmits measured channel information generated by measuring the transport block to the first device, and performs decoding at a second decoder by receiving a retransmitted transport block based on a difference between channel information estimated at a time of transmission of the transport block by the first device and the measured channel information being greater than a threshold. A time of reception of the retransmitted transport block precedes a time of completion of decoding of the transport block in the first decoder.

Figure 19:
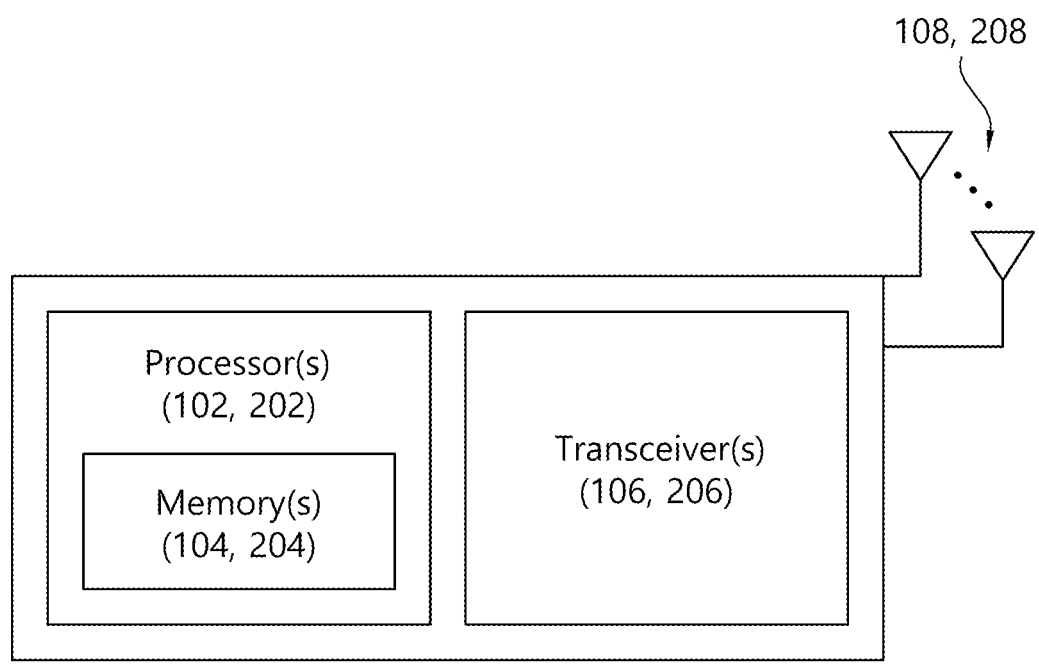
FIG. 19 illustrates another example of a wireless device that can be applied to the present disclosure.

FIG. 19 shows another example of a wireless device that can be applied to this specification.

Referring to FIG. 19, a wireless device may include at least one processor 102, 202, at least one memory 104, 204, at least one transceiver 106, 206, and one or more antennas 108, 208.

A difference between the wireless device example previously described in FIG. 18 and the wireless device example in FIG. 19 is that in FIG. 18, the processor 102, 202 and memory 104, 204 are separate, whereas in the example in FIG. 19, the processor 102, 202 includes memory 104, 204.

The aforementioned method may also be performed by a computer readable medium storing instructions causing the operation to be performed by one or more processors. The operations may include: transmitting the transport block to a second device, receiving measured channel information from the second device, and determining whether to retransmit the transport block based on a difference between the channel information estimated at the time of transmission of the transport block and the measured channel information.

Figure 20:
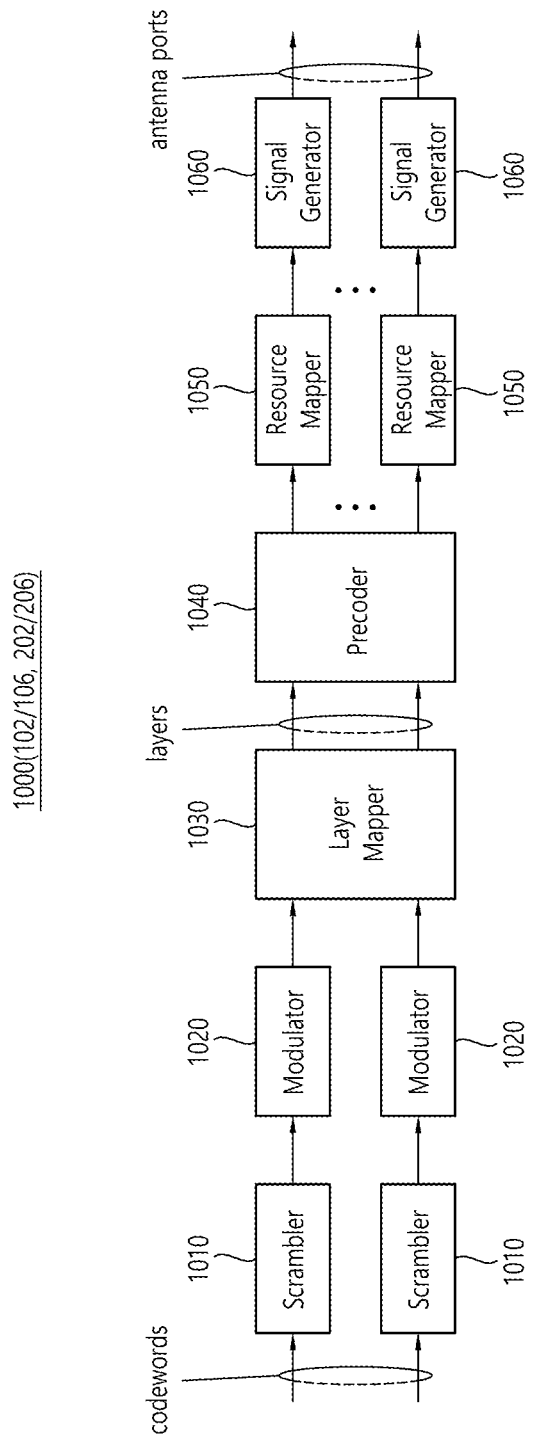
FIG. 20 illustrates a signal processing circuit for a transmission signal.

FIG. 20 exemplifies a signal processing circuit for a transmission signal.

Referring to FIG. 20, a signal processing circuit 1000 includes a scrambler 1010, a modulator 1020, a layer mapper 1030, a precoder 1040, a resource mapper 1050, and a signal generator 1060. The operations/functions of FIG. 20 may be performed in the processors 102 and 202 and/or the transceivers 106 and 206 of FIG. 18 but are not limited thereto. The hardware elements of FIG. 20 may be implemented in the processors 102 and 202 and/or the transceivers 106 and 206 of FIG. 18. For example, blocks 1010 to 1060 may be implemented in the processors 102 and 202 of FIG. 18. In addition, blocks 1010 to 1050 may be implemented in the processors 102 and 202 of FIG. 18, and block 1060 may be implemented in the transceivers 106 and 206 of FIG. 18.

A codeword may be converted into a wireless signal through the signal processing circuit 1000 of FIG. 20. Here, the codeword is an encoded bit sequence of an information block. The information block may include a transport block (e.g., a UL-SCH transport block or a DL-SCH transport block). The wireless signal may be transmitted through various physical channels (e.g., PUSCH or PDSCH) of FIG. 2.

Specifically, the codeword may be converted into a scrambled bit sequence by the scrambler 1010. The scramble sequence used for scrambling is generated based on an initialization value, and the initialization value may include ID information of a wireless device. The scrambled bit sequence may be modulated by the modulator 1020 into a modulation symbol sequence. The modulation scheme may include pi/2-binary phase shift keying (pi/2-BPSK), m-phase shift keying (m-PSK), m-quadrature amplitude modulation (m-QAM), and the like. The complex modulation symbol sequence may be mapped to one or more transport layers by the layer mapper 1030. The modulation symbols of each transport layer may be mapped to the corresponding antenna port(s) by the precoder 1040 (precoding). An output z of the precoder 1040 may be obtained by multiplying an output y of the layer mapper 1030 by an N*M precoding matrix W. Here, N is the number of antenna ports and M is the number of transmission layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to a time-frequency resource. The time-frequency resource may include a plurality of symbols (e.g., CP-OFDMA symbols or DFT-s-OFDMA symbols) in a time domain and may include a plurality of subcarriers in a frequency domain. The signal generator 1060 may generate a wireless signal from the mapped modulation symbols, and the generated wireless signal may be transmitted to another device through each antenna. To this end, the signal generator 1060 may include an inverse fast Fourier transform (IFFT) module, a cyclic prefix (CP) inserter, a digital-to-analog converter (DAC), a frequency uplink converter, and the like.

A signal processing process for a received signal in the wireless device may be configured as the reverse of the signal processing process (1010 to 1060) of FIG. 20. For example, a wireless device (e.g., 100 or 200 in FIG. 18) may receive a wireless signal from the outside through an antenna port/transmitter. The received wireless signal may be converted into a baseband signal through a signal restorer. To this end, the signal restorer may include a frequency downlink converter, an analog-to-digital converter (ADC), a CP canceller, and a fast Fourier transform (FFT) module. Thereafter, the baseband signal may be restored into a codeword through a resource de-mapper process, a postcoding process, a demodulation process, and a de-scramble process. The codeword may be restored to an original information block through decoding. Accordingly, a signal processing circuit (not shown) for a received signal may include a signal restorer, a resource demapper, a postcoder, a demodulator, a descrambler, and a decoder.

Figure 21:
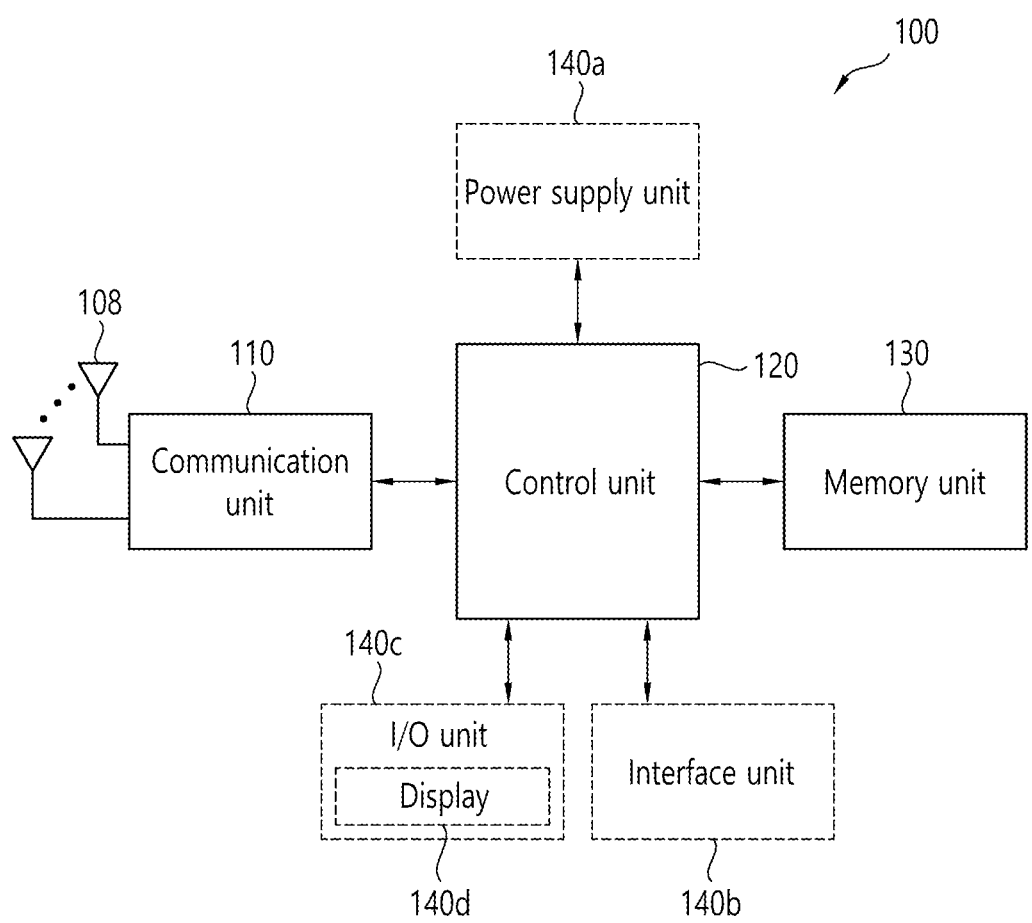
FIG. 21 illustrates a mobile device applicable to the present disclosure.

FIG. 21 illustrates a portable device applied to the present disclosure. The portable device may include a smartphone, a smart pad, a wearable device (e.g., smart watch or smart glasses), a portable computer (e.g., a notebook), etc. The portable device may be referred to as a mobile station (MS), a user terminal (UT), a mobile subscriber station (MSS), a subscriber station (SS), an advanced mobile station (AMS), or a wireless terminal (WT).

Referring to FIG. 21, the portable device 100 may include an antenna unit 108, a communication unit 110, a controller 120, a memory unit 130, a power supply unit 140a, an interface unit 140b, and input/output unit 140c. The antenna unit 108 may be configured as a part of the communication unit 110.

The communication unit 110 may transmit and receive signals (e.g., data, control signals, etc.) with other wireless devices and BSs. The controller 120 may perform various operations by controlling components of the portable device 100. The controller 120 may include an application processor (AP). The memory unit 130 may store data/parameters/programs/codes/commands required for driving the portable device 100. Also, the memory unit 130 may store input/output data/information, and the like. The power supply unit 140a supplies power to the portable device 100 and may include a wired/wireless charging circuit, a battery, and the like. The interface unit 140b may support connection between the portable device 100 and other external devices. The interface unit 140b may include various ports (e.g., audio input/output ports or video input/output ports) for connection with external devices. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in the case of data communication, the input/output unit 140c acquires information/signals (e.g., touch, text, voice, image, or video) input from the user, and the acquired information/signals may be stored in the memory unit 130. The communication unit 110 may convert information/signals stored in the memory into wireless signals and may directly transmit the converted wireless signals to other wireless devices or to a BS. In addition, after receiving a wireless signal from another wireless device or a BS, the communication unit 110 may restore the received wireless signal to the original information/signal. The restored information/signal may be stored in the memory unit 130 and then output in various forms (e.g., text, voice, image, video, or haptic) through the input/output unit 140*c*.

The claims described herein may be combined in various ways. For example, a combination of the technical features of the method claims of this specification may be implemented as an apparatus, and a combination of the technical features of the apparatus claims of this specification may be implemented as a method. Further, a combination of technical features of the method claims of this specification and technical features of the apparatus claims of this specification may be implemented as an apparatus, and a combination of technical features of the method claims of this specification and technical features of the apparatus claims of this specification may be implemented as a method. Other implementations are within the scope of the following claims.

What is claimed is:

1. A method of transmitting a transport block of a first device in a wireless communication system, the method comprising:
   transmitting the transport block to a second device;
   receiving measured channel information from the second device; and
   determining whether to retransmit the transport block based on a difference between channel information estimated at a time of transmission of the transport block and the measured channel information.

2. The method of claim 1, wherein the transport block is retransmitted based on the difference being greater than a predetermined threshold.

3. The method of claim 1, wherein the transport block is not retransmitted based on the difference being less than or equal to a predetermined threshold.

4. The method of claim 1, further comprising:
   receiving first channel information from the second device prior to transmitting the transport block to the second device,
   wherein the first channel information comprises information relating to at least one of a signal-to-interference-plus-noise ratio (SINR), a signal-to-noise ratio (SNR), and a modulation and coding scheme (MCS) of a previous transport block received by the second device.

5. The method of claim 4, wherein a modulation and coding scheme (MCS) of the transport block is estimated based on the first channel information, and the transport block is encoded using the estimated MCS and transmitted to the second device.

6. The method of claim 1, wherein the estimated channel information includes information related to an MCS index, SINR, or SNR of the transport block.

7. The method of claim 1, wherein the measured channel information includes channel state information generated by the second device by measuring a reference signal in the transport block.

8. A first device operating in a wireless communication system, the first device comprising:
   at least one transceiver;
   at least one memory; and
   at least one processor operably coupled to the at least one memory,
   wherein the at least one processor is adapted to:
   transmit the transport block to a second device,
   receive measured channel information from the second device, and
   determine whether to retransmit the transport block based on a difference between channel information estimated at a time of transmission of the transport block and the measured channel information.

9. The first device of claim 8, wherein the transport block is retransmitted based on the difference being greater than a predetermined threshold.

10. The first device of claim 8, wherein the transport block is not retransmitted based on the difference being less than or equal to a predetermined threshold.

11. The first device of claim 8, wherein the at least one processor is further adapted to:
    receive first channel information from the second device prior to transmitting the transport block to the second device,
    wherein the first channel information comprises information relating to at least one of a signal-to-interference-plus-noise ratio (SINR), a signal-to-noise ratio (SNR), and a modulation and coding scheme (MCS) of a previous transport block received by the second device.

12. The first device of claim 11, wherein a modulation and coding scheme (MCS) of the transport block is estimated based on the first channel information, and the transport block is encoded using the estimated MCS and transmitted to the second device.

13. The first device of claim 8, wherein the estimated channel information includes information related to an MCS index, SINR, or SNR of the transport block.

14. The first device of claim 8, wherein the measured channel information includes channel state information generated by the second device by measuring a reference signal in the transport block.

15. A method of operating a second device in a wireless communication system, the method comprising:
    receiving a transport block from a first device and performing decoding at a first decoder;
    transmitting measured channel information generated by measuring the transport block to the first device; and
    performing decoding at a second decoder by receiving a retransmitted transport block based on a difference between channel information estimated at a time of transmission of the transport block by the first device and the measured channel information being greater than a threshold,
    wherein a time of reception of the retransmitted transport block precedes a time of completion of decoding of the transport block in the first decoder.

* * * * *